(12) United States Patent
Ninomiya et al.

(10) Patent No.: US 6,488,458 B2
(45) Date of Patent: *Dec. 3, 2002

(54) TAPER IMPLANT AND A SCREW-FASTENING STRUCTURE USING A TAPER IMPLANT WITH FEMALE THREADS

(75) Inventors: Chikakazu Ninomiya, Hadano; Takeji Shiokawa; Kuninori Imai, both of Kanagawa-ken; Mitsuo Miyamoto, Hadano; Mitsuya Mikawa, Isehara, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 289 days.

(21) Appl. No.: 08/803,232

(22) Filed: Feb. 20, 1997

(65) Prior Publication Data

US 2001/0007628 A1 Jul. 12, 2001

(30) Foreign Application Priority Data

Feb. 23, 1996 (JP) .............................................. 8-036530
Jan. 24, 1997 (JP) .............................................. 9-011355

(51) Int. Cl.[7] .................................................. F16B 37/02
(52) U.S. Cl. ........................ 411/172; 411/180; 411/339; 29/525
(58) Field of Search .............................. 411/176, 177, 411/180, 182, 172, 338, 339; 29/525

(56) References Cited

U.S. PATENT DOCUMENTS

| | | | | |
|---|---|---|---|---|
| 2,307,080 A | * | 1/1943 | Schafer | 411/177 |
| 2,544,304 A | * | 3/1951 | Eckenbeck | 411/180 |
| 2,722,259 A | * | 11/1955 | Eckenbeck | 411/180 |
| 3,185,343 A | | 5/1965 | Braendel et al. | |
| 3,215,813 A | | 11/1965 | Dietlein | |
| 3,370,631 A | | 2/1968 | James | |
| 3,434,521 A | * | 3/1969 | Flora | 411/180 |
| 5,131,795 A | * | 7/1992 | Kobusch | 411/180 |

FOREIGN PATENT DOCUMENTS

| | | | | |
|---|---|---|---|---|
| DE | 3243254 | * | 5/1984 | 411/82 |
| DE | 4222248 A1 | | 1/1994 | |
| JP | 50-40976 | | 8/1973 | |
| JP | 51-48872 | | 4/1976 | |
| JP | 53-140853 | | 12/1977 | |
| JP | 54-1904 | | 1/1979 | |
| JP | 57-153813 | | 9/1982 | |
| JP | 60-14611 | | 1/1985 | |
| JP | 62-125897 | | 8/1987 | |
| JP | 63-45412 | | 3/1988 | |
| JP | 64-48636 | | 2/1989 | |
| JP | 5-187424 | | 7/1993 | |
| JP | 7-158139 | | 6/1995 | |

* cited by examiner

*Primary Examiner*—Flemming Saether
(74) *Attorney, Agent, or Firm*—Mattingly, Stanger, & Malur, P.C.

(57) ABSTRACT

A taper implant includes a taper portion having an outer surface frust-conical in shape. A flange portion is formed at an outermost end of the taper portion on the larger-diameter side to project outwardly with respect to the taper portion and having a flat surface situated perpendicularly to the axial direction of the taper portion, and female threads serving as a fit portion extending in the axial direction of the taper portion. A hole taper portion and a hole step portion are drilled at the same time to bore a hole in one of the members to be fastened, and the taper implant is driven into the hole, thereby providing a screw fastening structure for the fastened members.

31 Claims, 17 Drawing Sheets

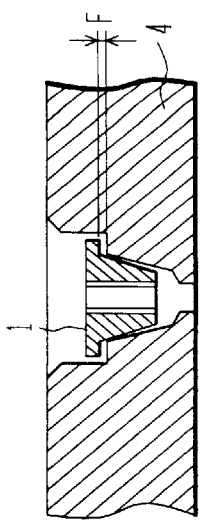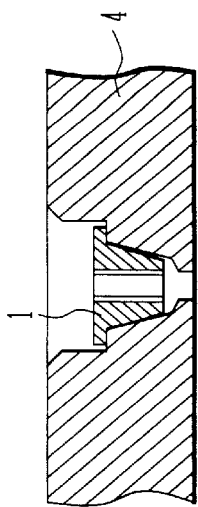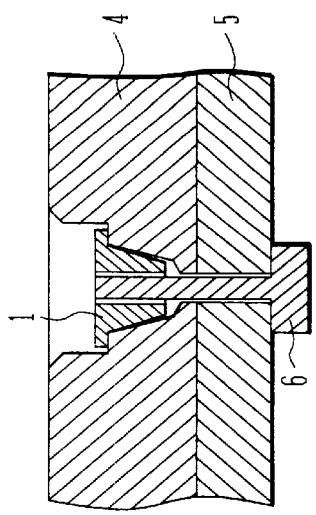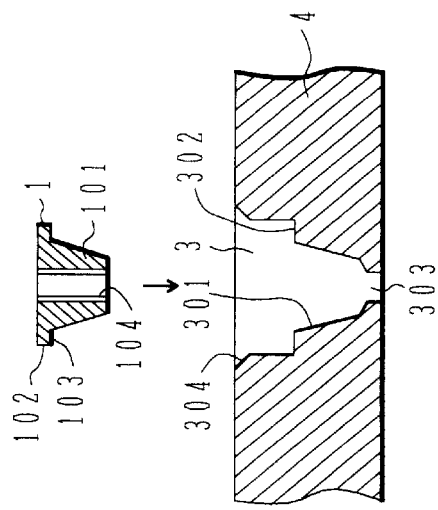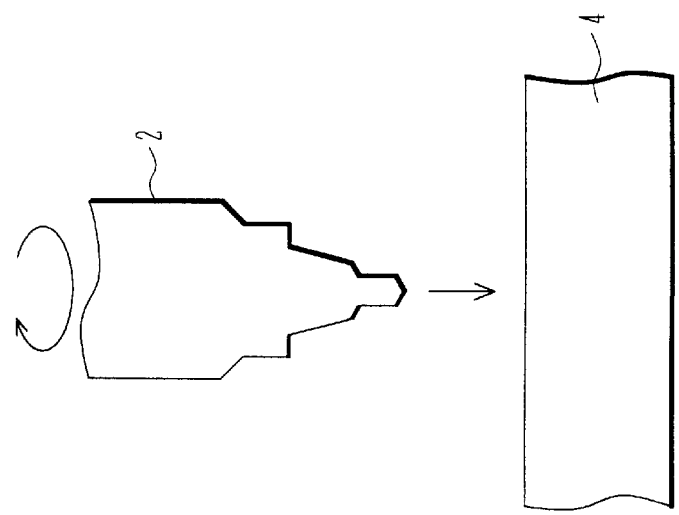

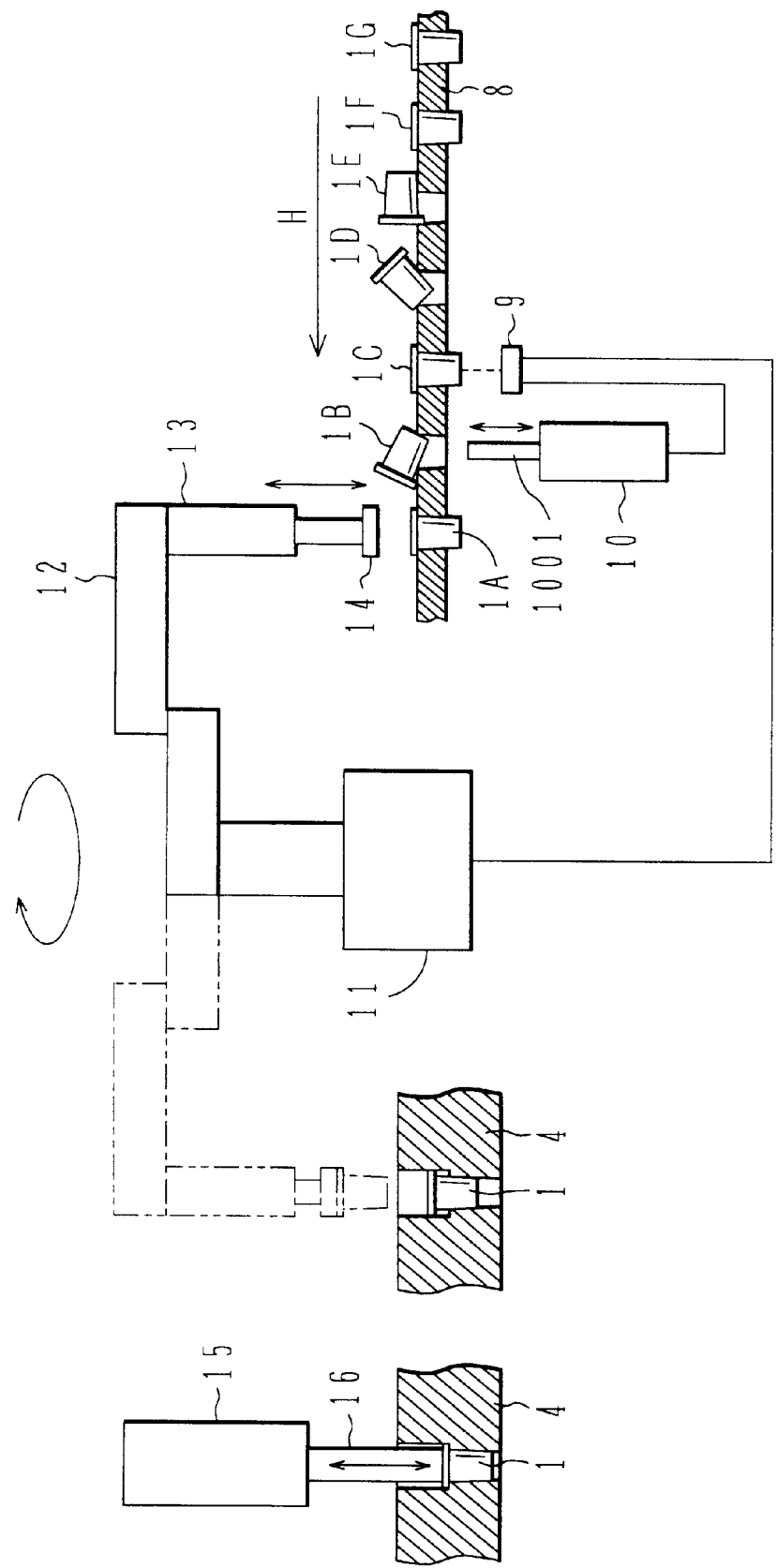

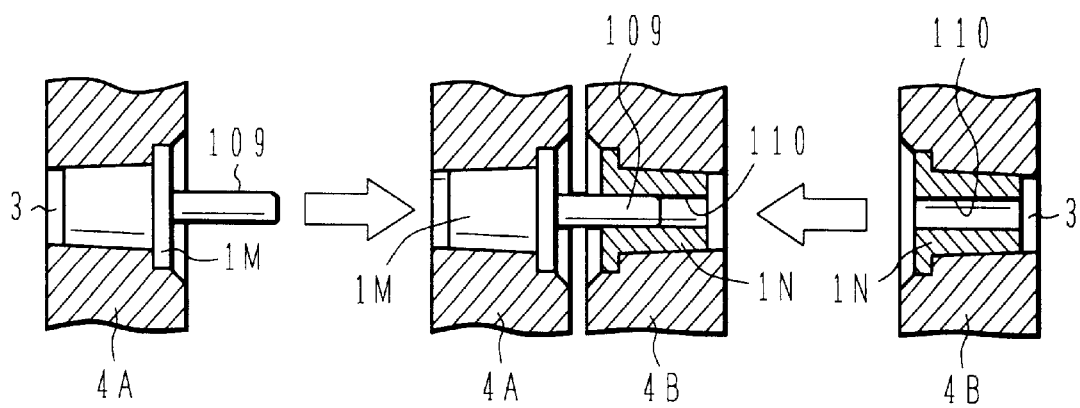
FIG.19A  FIG.19B  FIG.19C
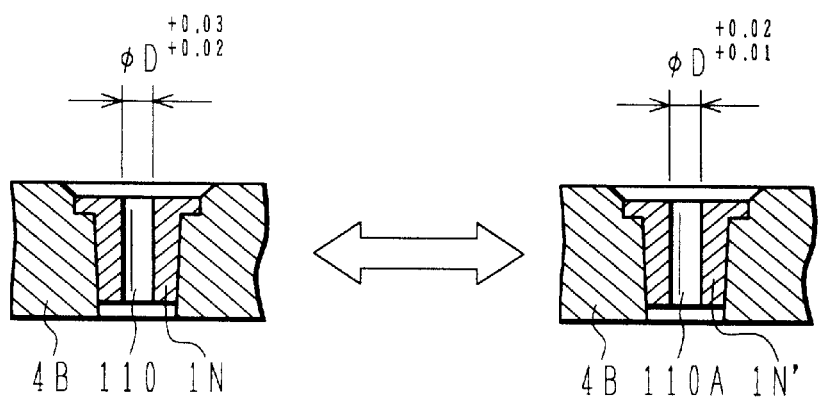
FIG.20A  FIG.20B

TAPER IMPLANT AND A SCREW-FASTENING STRUCTURE USING A TAPER IMPLANT WITH FEMALE THREADS

BACKGROUND OF THE INVENTION

The present invention relates to a taper implant, a screw-fastening structure using a taper implant with female threads, a forming drill for drilling an insertion hole for the taper implant, and a hammer for driving the taper implant.

Generally, often inserted or press-fitted into a soft base member, such as an aluminum plate, are those other members which are harder than the base member and have an axis perpendicular to the surface of the base member. For example, when female threads are tapped in an aluminum plate and this aluminum plate is fastened to another plate by using a male stainless screw, chips are generated and fall from the aluminum female threads upon the male screw being tightened into a hole with the female threads in the aluminum plate. If a falling of chips is not desired as, e.g., in the assembly step of electronic devices and units, a reinforcing member is often inserted into the hole with the female threads in the aluminum plate. Such a reinforcing member is in the form of a coil spring made of stainless steel having strength comparable to the male screw and being rhombic in cross-section. The reinforcing member is inserted into a threaded hole tapped beforehand to be fit with an outer periphery of the reinforcing member, and a male screw is inserted into the threaded hole along an inner periphery of the reinforcing member. The use of the reinforcing member prevents generation of chips because the male screw contacts the stainless reinforcing member.

As another example, a stainless positioning pin is sometimes press-fitted into a hole drilled in an aluminum plate.

However, when a reinforcing member is inserted into a hole of an aluminum plate, insertion of the reinforcing member requires a skill. More specifically, in the case of inserting the reinforcing member with a tool, while rotating it, into a threaded hole tapped to be fit with an outer periphery of the reinforcing member, the inserted reinforcing member may skip some threads of the threaded hole, or it may deform into a conical shape (as the reinforcing member is inserted, the inner diameter of its lower portion is gradually reduced), unless the worker is skilled. This has raised the problem that the process of inserting the reinforcing member is poor in working efficiency.

Also, when a stainless positioning pin is inserted into a hole of an aluminum plate, the positioning pin may be inserted obliquely with respect to the aluminum plate due to deformation of the aluminum plate, for example, unless the worker is skilled. This has raised the problem that the process of inserting the positioning pin is poor in working efficiency.

SUMMARY OF THE INVENTION

An object of the present invention is to provide a taper implant, a screw-fastening structure using a taper implant with female threads, a forming drill for drilling an insertion hole for the taper implant, and a hammer for driving the taper implant, each of which ensures good working efficiency.

To achieve the above object, a taper implant according to the present invention comprises a taper portion having an outer surface being frusto-conical in shape, and a projecting portion formed at an outermost end of the taper portion on the larger-diameter side to project outward with respect to the taper portion, and having a flat surface lying perpendicularly to the axial direction of the taper portion. In a preferable form, the projecting portion is a diskshaped flange portion which is uniformly projected outward from the outer surface of the taper portion. The taper implant further comprises a fit portion extending in the axial direction of the taper portion. With such a construction, just by dropping the taper implant into a hole bored in one of members to be fastened and having a hole taper portion, and then driving the taper implant into the hole by hitting the side of the flange portion, the taper portion and the flange portion are press-fitted to an inner wall surface of the hole bored in the fastened member, enabling the taper implant to be easily fixed to the fastened member, while the taper implant is prevented from overly thrusting into the hole. As a result, the working efficiency is improved.

Also, to achieve the above object, in screw-fastening structure using a taper implant with female threads according to the present invention, a hole having a hole taper portion gradually spreading toward a larger-diameter opening is drilled in a first member, a taper implant having a taper portion including female threads tapped therein beforehand is fitted to the hole taper portion, and a male screw is inserted and tightened into the female threads from the side of a second member, whereby the first and second members are fastened to each other. With that structure, the work of fastening two members to each other can be performed with high efficiency.

Further, to achieve the above object, in a forming drill for drilling an insertion hole for a taper implant according to the present invention, the drill integrally includes a taper portion drilling bit for boring a hole into which a taper portion of the taper implant is to be inserted, and a step portion drilling bit for boring a hole into which a projecting portion of the taper implant is to be inserted, and a hole taper portion and a hole step portion of the hole are drilled in a member at the same time by the integral bits of the drill. With such a construction, control of tight-fit accuracy of the taper implant can be facilitated.

In addition, to achieve the above object, a hammer for driving a taper implant according to the present invention comprises a piston pushed forth by a compression spring, and opening/closing means for selectively opening and closing an exhaust port communicating an air chamber with the outside, the exhaust port having a sectional area set larger than a sectional area of an air supply port through which compressed air is introduced to the air chamber, the piston being pushed back against biasing force of the compression spring by the compressed air introduced to the air chamber. With such a construction, the taper implant can be driven under driving force so reduced as to prevent damage of the fastened member, and the piston can be automatically pushed back to its start position. As a result, the work of driving the taper implant can be easily performed.

BRIEF DESCRIPTION OF THE DRAWINGS

FIGS. 5A, 5B, 5C, 5D and 5E are representations of steps for explaining a screw-fastening structure of two fastened members using the taper nut according to the first embodiment of the present invention.

FIG. 8 is an explanatory view of a system for automatically driving the taper nut according to the first embodiment of the present invention.

FIGS. 19A, 19B and 19C are representations for explaining a process for positioning two base members by using both a taper implant with a positioning pin according to the sixth embodiment of the present invention and the taper implant with a positioning hole according to the seventh embodiment of the present invention.

FIGS. 20A and 20B are partial vertical sectional views for explaining a manner of changing tolerance of the positioning hole formed in the taper implant with a positioning hole according to the seventh embodiment of the present invention.

DESCRIPTION OF THE PREFERRED EMBODIMENT

A taper nut as one example of a taper implant with female threads according to a first embodiment of the present invention will be described below with reference to FIGS. 1 to 10.

Figure 1:
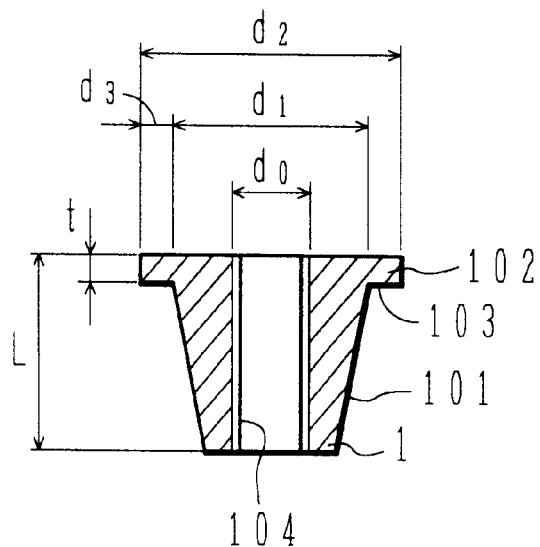
FIG. 1 is a vertical sectional view showing the conceptual structure of a taper nut according to a first embodiment of the present invention.

In FIG. 1, a taper nut 1 as one example of-the taper implant with female threads according to this embodiment comprises a taper portion 101 and a flange portion 102. The taper portion 101 has an outer surface being frusto-conical in shape. The flange portion 102 is formed at an outermost end of the taper portion 101 on the larger-diameter side. A lower surface 103 of the flange portion 102 is extended perpendicularly to the axial direction of the taper portion 101.

Further, female threads 104 are tapped through the taper nut 1 beforehand. The female threads 104 have an axis aligned with the axis of the taper portion 101. In other words, the female threads 104 serve as a coaxial fit portion extending in the axial direction of the taper portion 101.

In use, as described later, the taper nut 1 is implanted into a hole formed in a soft base member. When the soft base member is made of aluminum, the taper nut 1 is fabricated of stainless steel. Thus, the taper nut 1 implanted in a base member is generally fabricated of materials harder than the base member. The taper nut 1 is employed to fasten two plates to each other in combination with a male screw. One first plate in which the taper nut 1 is implanted and the other second plate are fastened together by inserting the male screw into a hole formed in the second plate and then screwing it into the female threads 104 formed in the taper nut 1.

The first plate is, e.g., a backboard frame made of aluminum fixedly mounted in a housing of a universal computer. The second plate is, e.g., a printed board fixedly fastened onto the backboard frame. By way of example, the backboard frame has overall dimensions of 800 mm×600 mm, a thickness of 15 mm, and weight of about 8 kg. The printed board has overall dimensions of 760 mm×560 mm and weight of about 30 kg in a condition that logical devices such as CPU and storage devices such as memories are mounted on its surface. When the backboard frame and printed board are fastened to each other with a pair of the above-mentioned taper nut 1 and a male screw, both the members can be firmly fastened together by using 70 pairs of the taper nuts 1 and the male screws.

Here, it is assumed that the outer diameter of the male screw put into the female threads is d0, the maximum diameter of the taper portion 101 at its end on the larger-diameter side is d1, the outer diameter of the flange portion 102 is d2, and the width of the flange portion 102 is d3. It is also assumed that the length of the taper nut 1 is L and the thickness of the flange portion 102 is t.

Figure 2:
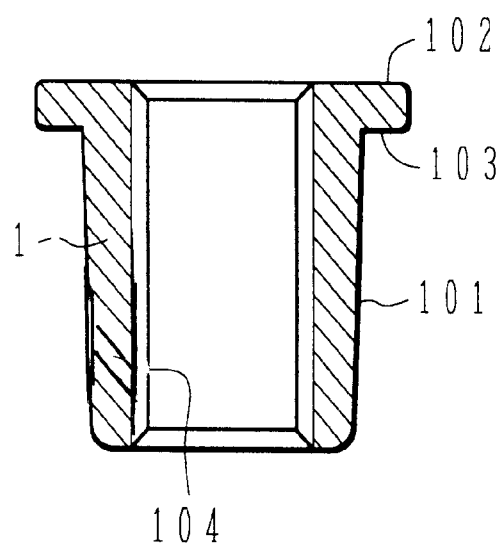
FIG. 2 is an enlarged vertical sectional view showing the taper nut according to the first embodiment of the present invention.

Actual size and shape of the taper nut according to the first embodiment of the present invention, which was fabricated corresponding to a male screw of type M4, will now be described with reference to FIG. 2. Note that FIG. 2 shows the actual taper nut enlarged five times. Also, the same reference numerals as in FIG. 1 denote the same portions.

In FIG. 2, a male screw put into the female threads tapped through the taper nut 1 is of type M4 and the outer diameter d0 thereof is 4 mm. Correspondingly, dimensions of the taper nut 1 are set as follows. The maximum diameter d1 of the taper portion 101 is 6 mm, the outer diameter d2 of the flange portion 102 is 8 mm, and the width d3 of the flange portion 102 is 1 mm. Also, the length L of the taper nut 1 is 8 mm and the thickness t of the flange portion 102 is 1 mm. Furthermore, the taper portion 101 has a taper rate of 1/20.

A forming drill for boring a hole in which the taper nut is one example of the taper implant with female threads according to the first embodiment of the present invention is to be implanted, and the configuration of a hole bored in a base member by the forming drill will now be described with reference to FIGS. 3 and 4.

Figure 3:
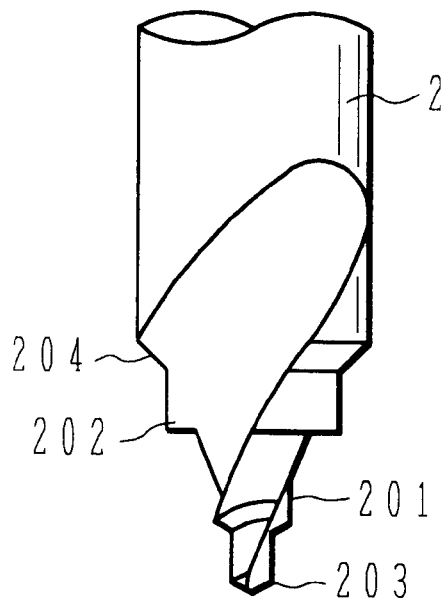
FIG. 3 is a side view of a forming drill for use with the taper nut according to the first embodiment of the present invention.
Figure 4:
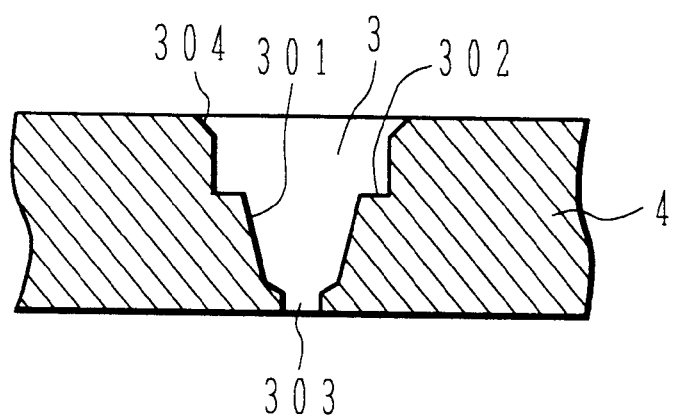
FIG. 4 is an explanatory view of a hole bored by the forming drill shown in FIG. 3.

A forming drill 2 as one example of drilling tools, shown in FIG. 3, integrally includes a taper portion drilling bit 201 for boring a hole into which the taper portion 101 of the taper nut 1 is to be inserted, and a step portion drilling bit 202 for boring a hole into which the flange portion 102 of the taper nut 1 is to be inserted. The forming drill 2 further includes a guide hole drilling bit 203 for boring a guide hole to guide the male screw when it is inserted, and a hole end deburring bit 204 for removing burrs at an uppermost edge of the bored hole. The guide hole drilling bit 203 has an outer diameter larger than the outer diameter of the male screw inserted. The guide hole drilling bit 203 and the hole end deburring bit 204 are required to be adjusted in length and position depending on the thickness of a plate to be fastened.

The forming drill 2 can simply bore a fit hole with high precision by attaching it to a drilling machine, for example, and operating the machine for drilling. It is needless to say that if a machining center having high rigidity is employed, the precision is further improved.

The configuration of the hole bored by the forming drill 2 shown in FIG. 3 will now be described with reference to FIG. 4.

A first member 4 to be fastened is a plate made of an aluminum alloy. A hole 3 is bored in the fastened member 4 by the forming drill 2. The hole 3 comprises a hole taper portion 301 bored by the taper portion drilling bit 201 of the forming drill 2, a hole step portion 302 bored by the step portion drilling bit 202, a male screw guide portion 303 bored by the guide hole drilling bit 203, and a hole end chamfered portion 304 formed by the hole end deburring bit 204.

The depth of the hole step portion 302 is not under any restrictions, but may be optionally selected to be deep or shallow depending on the fastening structure used. In this embodiment, it is important to drill the hole taper portion 301 and the hole step portion 302 at the same time for the reason described later.

Steps of screwing two fastened members by using the taper nut according to the first embodiment of the present invention will now be described with reference to FIGS. 5A–5E.

As shown in FIG. 5A, a hole into which the taper nut is to be fitted is bored in the fastened member 4 made of an aluminum alloy by using the forming drill 2.

With the drilling shown in FIG. 5A, the hole 3 is bored in the fastened member 4 as shown in FIG. 5B. As described above in connection with FIG. 4, the hole 3 comprises the hole taper portion 301, the hole step portion 302, the male screw guide portion 303, and the hole end chamfered portion 304. The taper nut 1 made of stainless steel is fitted into the hole 3. As described above in connection with FIG. 1 or 2, the taper nut 1 comprises the taper portion 101, the flange portion 102, and the female threads 104.

The taper portion 101 of the taper nut 1 is so sized as to lightly tight-fit into the hole taper portion 301 of the hole 3 when fitted. Specifically, as shown in FIG. 5C, in a state of the taper nut 1 being simply dropped into the hole 3, the lower surface 103 of the flange portion 102 is floated from the hole step portion 302 of the hole 3. Here, an amount F by which the lower surface 103 of the flange portion 102 is floated from the hole step portion 302 of the hole 3 will be referred to as a tight-fit allowance.

By hitting an upper surface of the flange portion 102 of the taper nut 1 in the state shown in FIG. 5C, the taper nut 1 is driven into the hole 3 of the fastened member 4 and then stopped when the flange portion 102 comes into abutment against the hole step portion 302.

Since the hole taper portion 301 of the hole 3 and the taper portion 101 of the taper nut 1 engage each other, the axis of the hole 3 and the axis of the taper nut 1 are aligned with each other. By forming the hole 3 in rectangular relation to the surface of the fastened member 4, therefore, the axis of the taper nut 1 also lies perpendicularly to the surface of the fastened member 4. Thus, by tapping the female threads 104 through the taper nut 1 to have an axis aligned with the axis of the taper portion 101 of the taper nut 1, it is possible to easily position the axis of the female threads 104 in rectangular relation to the surface of the fastened member 4.

Further, with the flange portion 102 provided at the top of the taper nut 1, the taper nut 1 is surely stopped upon the lower surface 103 of the flange portion 102 of the taper nut 1 abutting against the hole step portion 302 of the hole 3. If the flange portion 102 is not provided, the taper nut 1 would be thrust into the hole 3 and the hole 3 of the fastened member 4 would be greatly deformed because the fastened member 4 made of an aluminum alloy is softer than the taper nut 1 made of stainless steel. By contrast, with the flange portion 102 provided on the taper nut 1 in this embodiment, it is possible to prevent the taper nut 1 from overly thrusting into the hole 3 and hence prevent the hole 3 from deforming.

In a state shown in FIG. 5D, because the taper nut 1 is fixedly held on the fastened member 4 by frictional forces, the tight-fit allowance F of the taper nut 1 for the hole 3 is required to be controlled with good precision. To this end, it is important to not only drill the taper portion 101 of the taper nut 1 with good precision, but also drill the hole taper portion 301 and the hole step portion 302 of the hole 3 at the same time. The tight-fit precision of the taper nut is determined by the precision of two bits of the forming drill 2, i.e., the taper portion drilling bit 201 and the step portion drilling bit 202, for drilling both the hole taper portion 301 and the hole step portion 302 at the same time. In other words, because the taper nut 1 is advanced while spreading the hole 3 in the course of being driven and then stopped upon contact of the flange portion 102 of the taper nut 1 with the hole step portion 302 of the hole 3, the hole taper portion 301 and the hole step portion 302 of the hole 3 must be drilled with high precision.

For achieving a stable fastening structure, it is also important to control the tight-fit allowance F of the taper nut 1 for the hole 3 with high precision. Taking as an example the taper nut fabricated corresponding to a male screw of type M4, which has been described above in connection with FIG. 2, the maximum diameter d1 of the taper portion 101 is 6 mm and the tolerance range of actual dimension is set to span from +0.02 mm to +0.04 mm. Thus, the average tolerance is +0.03 mm. On the other hand, the maximum diameter of the taper portion drilling bit 201 of the forming drill 2, shown in FIG. 3, for boring the taper portion 101 of the taper nut 1 is 6 mm and the tolerance range of actual dimension is set to span from −0.01 mm to +0 mm. Thus, the average tolerance is −0.005 mm. In other words, the precision is controlled such that the maximum diameter of the hole taper portion 301 of the hole 3 bored by the taper portion drilling bit 201 is 0.035 mm smaller than the maximum diameter of the taper portion 101 of the taper nut 1. Further, the taper rate of the taper portion drilling bit 201 of the forming drill 2 and the taper rate of the taper portion 101 of the taper nut 1 are both set equal to 1/20. The tight-fit allowance F of 0.7 mm (=0.035 mm×20) is thereby resulted. Consequently, the tight-fit allowance F of the taper nut 1 for the hole 3 can be controlled with good precision by drilling the taper portion 101 of the taper nut 1 accurately and drilling both the hole taper portion 301 and the hole step portion 302 of the hole 3 at the same time.

Next, as shown in FIG. 5E, when a second fastened member 5 having a hole 501 bored therethrough is fastened to the first fastened member 4, the second fastened member 5 is placed adjacent the rear side of the first fastened member 4 into which the taper nut 1 has been implanted, and the two members are tightly joined together by using a male screw 6. In the case of the first fastened member 4 being made of an aluminum alloy, the second fastened member 5 is, e.g., a printed board on which circuit devices are mounted. Since the male screw 6 imposes a load on the taper unit 1 in the direction to tighten the taper-fit, there is no risk that the taper nut 1 may be loosened from the first fastened member 4. Also, if desired, the taper nut 1 can be simply removed from the hole taper portion 301 of the hole 3 just by lightly hitting the head of the male screw 6 in a state that the male screw 6 is loosened.

As a test experiment, the taper nut 1 corresponding to a male screw of type M4 was fabricated of stainless steel, and the first fastened member 4 was fabricated of an aluminum alloy. A condition of the taper nut 1 driven into the first fastened member 4 was examined by setting the taper rate of each of the two parts to 1/20 and variously changing the maximum diameter d1 of the taper portion 101 of the taper nut 1 to vary the tight-fit allowance of the taper portion 101. As a result, it was confirmed that although the tight-fit allowance of the taper portion 101 was changed in the range of 0.1 to 0.7 mm, the taper nut 1 could be easily driven into the first fastened member 4 and fixedly held there with satisfactory tightness without causing any rotation. From a test of turning the male screw into taper nut 1, it was also confirmed that the taper nut 1 developed no rotation and two fastened members could be firmly fastened together.

The taper rate is the most important parameter in the present invention. To ensure that the taper nut is not only easily driven, but also held in a driven state with good reliability, the taper angle must be at least smaller than the friction angle. From the viewpoints of easiness in driving and reliability in maintaining of the driven state, it was confirmed that the taper rate of 1/20 was an optimum value. But, the taper rate in the range of 1/50 to 1/10 also showed preferable results from the practical point of view. Further, the taper rate in the range of 1/7 to 1/6 was also found applicable without problems. However, the greater driving force is required as the taper rate increases, and there occurred a phenomenon that the driven taper nut sprang out from the hole, when the taper rate exceeded 1/6.

The present invention is not limited to the use of a male screw of type M4, but can be applied to male screws of types M2 to M10 as well. Preferable dimensions of taper nuts employed in combination with those male screws are as follows.

Assuming that the outer diameter (mm) of the male screw is d0, the maximum diameter d1 of the taper portion 101 of the taper nut 1 is preferably in the range of:

$$d1=(1.1\sim2.0)\times d0$$

A more preferable range of d1 is given by:

$$d1=(1.1\sim1.5)\times d0$$

The outer diameter d2 of the flange portion 102 of the taper nut 1 is preferably in the range of:

$$d2=d0+(0.5\sim3.0)$$

The thickness t of the flange portion 102 of the taper nut 1 is preferably in the range of:

$$t=0.5\sim3 \text{ mm}$$

The taper rate of the taper portion 101 is, as stated above, preferably in the range of:

$$\text{taper rate}=1/50\sim1/10$$

The overall length L of the taper nut 1 is preferably in the range of:

$$L=(1\sim3)\times d0$$

The tight-fit allowance F of the taper portion 101 is, in relation to the maximum diameter d1 of the taper portion 101, preferably in the range of:

$$F=(2\sim20\%)\times d1$$

The values mentioned above are applied to the case of fastening members made of soft metal (such as an aluminum alloy or pure copper). If softer materials (such as wood or plastics) are employed, it is advantageous that the taper rate is set to a relatively large value in the range of 1/30 to 1/5 and the width d3 of the flange portion 102 is also set to a relatively large value in the range of 1 to 4 mm. By so setting the taper rate and the flange width to relatively large values, when two fastened members made of those softer materials are fastened to each other by using the taper nut and a male screw, the taper nut can be prevented from biting into the fastened member.

While the taper nut is made of stainless steel in the illustrated embodiment, materials of the taper nut are not limited to stainless steel, but may be selected from a variety of materials which are harder than the fastened member. In combination with an aluminum alloy or copper, steel (such as SS steel, carbon steel, slightly alloyed steel, or refined steel (hardened and tempered to HRC of about 15 to 25), for example, is also employed in addition to stainless steel. As nonferrous materials, phosphor bronze, brass, etc. are preferably used.

When the fastened member is made of wood, plastics, aluminum or the like can be used as materials of the taper nut. When the fastened member is made of plastics, aluminum, stainless steel, steel, phosphor bronze, brass or the like can be used as materials of the taper nut. When the fastened member is made of steel, hardened steel (super steel) can be used as materials of the taper nut.

Further, materials of the taper nut is not always required to be harder than materials of the fastened member, but may be comparable in hardness to the fastened member. In other words, when the fastened member is made of steel, steel can be used as materials of the taper nut.

Additionally, for the fastened member made of highly hard materials, such as a metal mold, the taper nut made of materials softer than the base member may be used in consideration of friction, breakage and replacement.

As described above, since the taper nut 1 having the female threads 104 can be fixedly implanted into the fastened member 4 with ease just by dropping the taper nut 1 into the hole 3 of the fastened member 4, having the hole taper portion 301, and hitting the taper nut 1 from the side of flange portion 102, the working efficiency is improved.

Also, with the engagement between the taper portion 101 of the taper nut 1 and the hole taper portion 301 of the hole 3, the female threads 104 tapped through the taper nut 1 are easily prevented from offsetting from coaxial relation to the hole 3 of the fastened member 4.

Further, since the flange portion 102 is provided at the top of the taper nut 1, the taper nut 1 is stopped when the lower surface 103 of the flange portion 102 of the taper nut 1 comes into abutment against the hole step portion 302 of the hole 3. Accordingly, by controlling the tight-fit allowance F defined as an amount by which the flange portion 102 of the taper nut 1 is floated from the hole step portion 302 of the hole 3 in a state that the taper nut 1 is dropped into the hole 3, it is possible to keep constant an amount by which the taper nut 1 is driven into the hole 3, frictional forces between the hole 3 and the taper nut 1, and hence fixing force to hold the taper nut in the hole.

Moreover, in this embodiment, since the hole taper portion 301 and the hole step portion 302 of the hole 3 are bored by using the forming drill 2 which includes the taper portion drilling bit 201 and the step portion drilling bit 202, control of the tight-fit allowance is facilitated.

Also, with the flange portion 102 provided at the top of the taper nut 1, the taper nut 1 is surely stopped upon the lower surface 103 of the flange portion 102 of the taper nut 1 abutting against the hole step portion 302 of the hole 3. If the flange portion 102 is not provided, the taper nut 1 would be thrust into the hole 3 and the hole 3 of the fastened member 4 would be greatly deformed because the fastened member 4 made of an aluminum alloy is softer than the taper nut 1 made of stainless steel. By contrast, with the flange portion 102 provided in the taper nut 1 in this embodiment, it is possible to prevent the taper nut 1 from overly thrusting into the hole 3 and hence prevent the hole 3 from deforming.

In addition, since the taper nut 1 and the nut 3 can be disengaged from each other by applying force to the taper nut 1 from the smaller-diameter side of the taper portion 101, i.e., by hitting the head of the male screw 6 engaged with the female threads 104, after loosening the male screw 6 to some extent, the taper nut 1 can be easily attached and detached.

Accordingly, the taper nut 1 can be easily replaced even when it is employed under situations where the female threads are much susceptible to wear or damage.

When the fastened member is discarded, it is possible to discard the fastened member and the taper nut, which are made of different materials, separately from each other. This contributes to protection of environment.

Since the removed taper nut can be reused, effective use of resources is promoted.

The conventional method of inserting a reinforcing member into a hole bored in a fastened member was not adaptable for small male screws of types M1 to M3 because the hole diameter is too small. By contrast, this embodiment can be applied to those small male screws as well because it is only required to tap female threads through the taper nut corresponding to any of the male screws of types M1 to M3.

Figure 6:
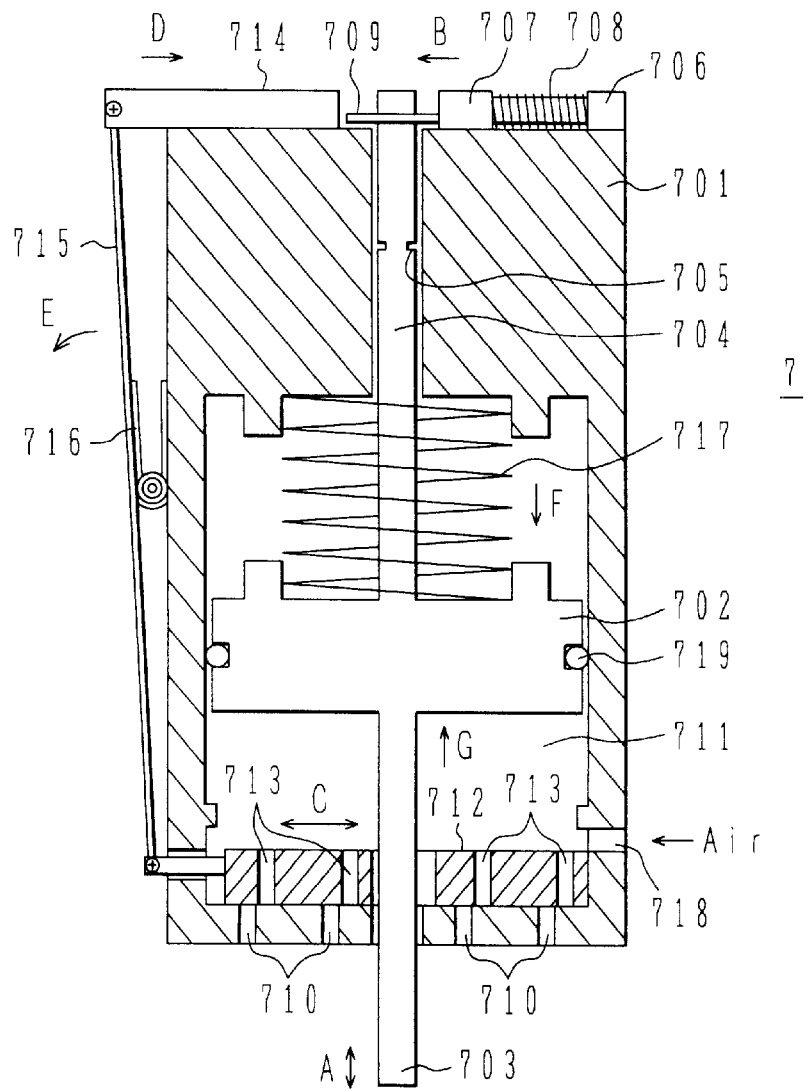
FIG. 6 is a partial sectional view of a hammer for driving the taper nut according to the first embodiment of the present invention.
Figure 7:
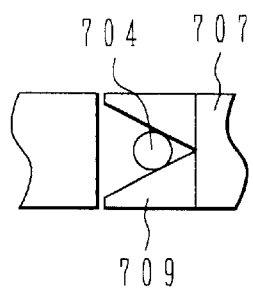
FIG. 7 is a partial plan view of FIG. 6.

The construction of a driving hammer for driving the taper nut of this embodiment into the hole bored in the fastened member will now be described with reference to FIGS. 6 and 7.

A driving hammer 7 is of hand-held type constructed such that the driving force of the driving hammer 7 is generated by a spring and, after completion of a driving stroke, air force is utilized as power to compress the spring.

The general structure of the driving hammer 7 will be first described with reference to FIG. 6.

A body 701 of the driving hammer 7 is cylindrical in shape and sized so as to enable the worker to grip it by the hand. Within an inner space of the body 701, a piston 702 is held to be vertically movable in a direction of arrow A. A lower rod 703 of the piston 702 is projected outward through a hole penetrating a bottom wall of the body 701, and has a tip used for hitting the taper nut. A notch 705 is formed in an upper rod 704 of the piston 702 approximately near the middle thereof. When the piston 702 is moved upward, the notch 705 comes into engagement with a movable block 707 provided at a fore end of a stopper 706, thereby stopping vertical movement of the piston 702. The movable block 707 is biased by a compression spring 708 in a direction of arrow B. Also, as shown in FIG. 7, a V-shaped slot 709 is formed in a fore end of the movable block 707. With the notch 705 of the piston 702 engaging the V-shaped groove 709, the vertical movement of the piston 702 is stopped.

A plurality of exhaust ports 710 are formed through the bottom wall of the body 701. Within an air chamber 711 defined below the piston 702 inside the body 701, there is disposed a spacer 712 slidably in a direction of arrow C. A plurality of exhaust ports 713 are formed through the spacer 712. By sliding the spacer 712 in the direction of arrow C, communication between the exhaust ports 710 of the body 701 and the exhaust ports 713 of the spacer 712 is selectively established and cut off.

The spacer 712 is slid by manually operating a switch 714 provided at the top of the body 701. The switch 714 and the spacer 712 are connected to each other through a lever 715. Therefore, when the switch 714 is operated to move in a direction of arrow D, the spacer 712 is slid to the left to establish the communication between the exhaust ports 710 of the body 701 and the exhaust ports 713 of the spacer 712. Simultaneously, with the movement of the switch 714 in the direction of arrow D, a right end of the switch 714 engages an left edge of the V-shaped slot 709 of the movable block 707, whereupon the movable block 707 is moved to the right to disengage the V-shaped slot 709 from the notch 705.

A coil spring 716 is disposed between the lever 715 and the body 701. Accordingly, when the switch 714 is released from the worker's hand, the lever 716 is turned in a direction of arrow E to slide the spacer 712 to the right, thereby cutting off the communication between the exhaust ports 710 of the body 701 and the exhaust ports 713 of the spacer 712.

A compression spring 717 is disposed between an upper surface of the piston 702 and an upper wall surface defining an inner space of the body 701. The compression spring 717 biases the piston in a direction of arrow F.

Further, compressed air is introduced through an air supply port 718 to the air chamber 711 in the body 701. An O-ring 719 is fitted over an outer periphery of the piston 702 to prevent the compressed air in the air chamber 718 from leaking upward from there.

The operation of the driving hammer 7 according to this embodiment will now be described. In an illustrated state, the exhaust ports 710 of the body 701 and the exhaust ports 713 of the spacer 712 are not communicated with each other. Therefore, when the compressed air is introduced through the air supply port 718, the piston 702 is raised in a direction of arrow G against the biasing force of the compression spring 717. At the same time, the upper rod 704 of the piston 202 is also raised, causing the notch 705 of the upper rod 704 to engage the V-shaped slot 709 of the movable block 707.

When driving the taper nut with the driving hammer 7, the worker grips the switch by the hand to operate it. The gripping force moves the switch 714 in the direction of arrow D and also slides the spacer 712 to the left through the lever 15 to establish the communication between the exhaust ports 710 of the body 701 and the exhaust ports 713 of the spacer 712. As a result, the compressed air in the air chamber 711 is exhausted through the exhaust ports 713 of the spacer 712. Here, by setting a total sectional area of the plurality of exhaust ports 710 much larger than the sectional area of the air supply port 718, not only the compressed air in the air chamber 711 is quickly exhausted to the outside, but also the compressed air introduced through the air supply port 718 is exhausted through the exhaust ports 713. Accordingly, the pressure in the air chamber 711 falls down to almost the atmospheric pressure.

When the worker further slides the switch 714 in the direction of arrow D to such an extent that the right end of the switch 714 engages the left edge of the V-shaped slot 709 of the movable block 707, the movable block 707 is moved to the right to disengage the V-shaped slot 709 from the notch 705. Since the compression spring 717 is always biasing the piston 702, the piston 702 is now allowed to slide in the direction of arrow F, causing the tip of the lower rod 703 to slide downward. As a result, the taper nut can be driven by holding the tip of the lower rod 703 pressed against an upper surface of the taper nut.

When the worker releases the switch 714 from the hand after one stroke of driving the taper nut, the spacer 712 is slid to the right to cut off the communication between the exhaust ports 710 of the body 701 and the exhaust ports 713 of the spacer 712. Accordingly, the compressed air introduced through the air supply port 718 is accumulated in the air chamber 711 and raises the piston 701 in the direction of arrow G against the biasing force of the compression spring 717. Then, the notch 705 of the upper rod 704 engages the V-shaped groove 709 of the movable block 707 to stop rising of the piston 702.

For each of cycles repeated as described above, it is possible to drive the taper nut by utilizing the biasing force of the compression spring 717 and, after that, to automatically raise the driving piston 702 to its initial position by utilizing the compressed air through the manual operation of the switch 714.

Since the piston 702 is slid after exhausting the compressed air out of the air chamber 711, the driving force of the piston is determined depending on the spring force of the compression spring 717. Therefore, the driving force of the piston is adjustable by changing the spring force of the compression spring 717.

If an air hammer or the like utilizing compressed air to produce driving force itself is employed as a hammer for driving the taper nut, in the form of a small part, of this embodiment, the driving force would be so strong as to cause a hopping motion that the tip of the lower rod of the piston is sprung back from the upper surface of the taper nut after being hit against the upper surface of the taper nut. This leads to a risk that the lower rod of the piston hit against the fastened member other than the taper nut, and the fastened member may be damaged. By contrast, in this embodiment wherein compression force of a spring is utilized as the force for driving the taper nut, the driving force can be set to a value smaller than produced in the case of utilizing the compressed air for driving. As a result, it is possible to prevent damage of the fastened member which would be otherwise caused due to the occurrence of the above hopping motion.

Further, if the piston is manually raised against the biasing force of the compression spring, this manual operation would be hard to complete. In this embodiment, the operation of raising the piston can be easily made because of utilizing the compressed air.

The entire construction of a system for automatically driving the taper nut according to this embodiment will now be described with reference to FIG. 8.

The process of driving each of several tens or more taper nuts into one fastened member in such a manner as described above can be efficiently performed by automating steps from supply to driving of the taper nuts. FIG. 8 shows the entire construction of an automatic driving system adapted for that purpose.

A number of openings are formed in a conveyor 8 with certain intervals therebetween. Taper nuts 1A, 1B, . . . , 1G, . . . are placed in the openings of the conveyor 8 in random and carried in a direction of arrow H.

A posture determining sensor 9 is disposed below the conveyor 8 to determine whether the taper nut 1 carried on the conveyor 8 is in a proper posture or not. The posture determining sensor 9 comprises, e.g., a proximity sensor. For those taper nuts 1A, 1F, 1G which are inserted into the opening of the conveyor 8 in the proper posture, since the distance between the posture determining sensor 9 comprising the proximity sensor and the taper nut 1 is short, the proximity sensor issues an output signal indicating that the taper nut is in the proper posture. On the contrary, for those taper nuts 1B, 1C, 1D, 1E which are not properly inserted into the opening of the conveyor 8, since the distance between the posture determining sensor 9 comprising the proximity sensor and the taper nut 1 is so long that the proximity sensor issues no output signal, based on which it can be determined that the taper nut is not in the proper posture.

An NG cylinder 10 is operated in accordance with a posture determination signal from the posture determining sensor 9. Specifically, if the posture of the taper nut placed on the conveyor 8 is not normal, the NG cylinder 10 receives an NG signal from the posture determining sensor 9 and is operated at the timing when the relevant taper nut 1 is carried to a position just above the NG cylinder 10, causing an end piston 1001 to advance to remove each of the taper nuts 1B, 1C, 1D, 1E not in the normal state from the conveyor 8.

A robot controller 11 controls the rotating operation of a robot 12 and the operation of a vacuum suction head 14 of a suction cylinder 13 attached to a tip of the robot 12. The robot controller 11 is operated in accordance with the posture determination signal from the posture determining sensor 9. Specifically, if the posture of the taper nut placed on the conveyor 8 is normal, the robot controller 11 receives an OK signal from the posture determining sensor 9 and operates the suction cylinder at the timing when the relevant taper nut 1 is carried to a position just below the vacuum suction head 14, thereby descending the vacuum suction head 14. After holding the taper nut 1 while sucking it, the vacuum suction head 14 is raised.

Then, the robot controller 11 operates the robot 12 to move the taper nut 1 to a position above the opening or hole of the fastened member 4. The fastened member 4 is rested on a table capable of moving in two directions of X-Y so that a plurality of openings formed in the fastened member 4 beforehand can be each positioned just below the vacuum suction head 14 one after another. By releasing a vacuum state of the vacuum suction head 14 when the taper nut 1 reaches a position just above the opening of the fastened member 4, the taper nut 1 is dropped into the opening. Here, the opening formed in the fastened member 4 has a hole taper portion as described above in connection with FIG. 4, whereas the taper nut 1 has the taper portion in its outer periphery as described above in connection with FIG. 1. Therefore, by merely dropping the taper nut 1 above the opening, the taper nut 1 can be easily inserted into the opening of the fastened member 4 as shown in FIG. 5C. When the taper nuts are inserted into all of the openings formed in the fastened member 4, the operation of inserting the taper nuts is completed.

Then, the fastened member 4 is transferred to a press-fitting station. In the press-fitting station, the fastened member 4 is rested on a table capable of moving in two directions of X-Y so that the plurality of openings formed in the fastened member 4 beforehand can be each positioned just below a piston 16 of a press-fitting cylinder 15 one after another. By operating the press-fitting cylinder 15 to descend the piston 16, the taper nut 1 can be driven into the opening of the fastened member 4. When the taper nuts are press-fitted to all of the openings formed in the fastened member 4, the operation of press-fitting the taper nuts is completed.

In that way, a plurality of taper nuts can be easily driven into the fastened member by using the automatic driving system.

A second example of the forming drill for boring a hole, into which the taper nut as one example of the taper implant with female threads according to the first embodiment of the present invention is to be implanted, will now be described with reference to FIGS. 9A–9B.

When the forming drill as one example of forming tools, described above in connection with FIG. 3, is employed, a cutting load is so increased that the drill may chatter in a drilling machine with low transverse rigidity. To avoid such a chattering, a forming drill 2' having the structure shown in FIGS. 9A–9B is employed.

Figure 9A:
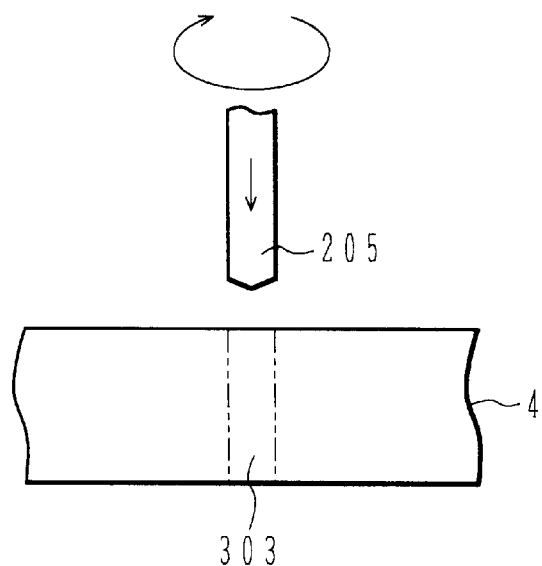
FIGS. 9A and 9B are explanatory representations of steps for drilling a hole by a second example of the forming drill for use with the taper nut according to the first embodiment of the present invention.

First, as shown in FIG. 9A, a guide hole 303 for a male screw is bored through the fastened member 4 by using an ordinary drill 205.

Figure 9B:
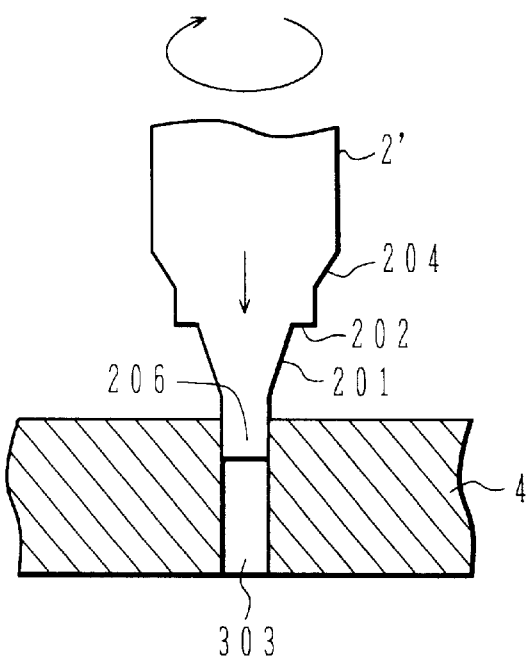

Then, as shown in FIG. 9B, a fitting hole is bored by using the forming drill 2' having a guide portion 206 whose outer diameter is 0.05 to 0.15 mm smaller than the diameter of the guide hole 303. In addition to the guide portion 206, as with the forming drill 2 shown in FIG. 3, the forming drill 2' integrally includes a taper portion drilling bit 201 for boring a hole into which the taper portion 101 of the taper nut 1 is to be inserted, and a step portion drilling bit 202 for boring a hole into which the flange portion 102 of the taper nut 1 is to be inserted. The forming drill 2 further includes a hole end deburring bit 204 for removing burrs at an uppermost end of the bored hole. The hole end deburring bit 204 is required to be adjusted in length and position depending on the thickness of a plate to be fastened.

The hole bored by using the forming drill 2' is the same as described above in connection with FIG. 4.

In the case of using the forming drill 2' thus structured, since the male screw guide hole 303 is first bored in the fastened member 4 by using the drill 205 and the forming drill 2' is then employed to bore the hole while the guide portion 206 at its tip is inserted into the guide hole 303, it is possible to suppress vibration in the transverse direction and prevent the occurrence of chattering even if a drilling machine with low transverse rigidity is used.

Figure 10A:
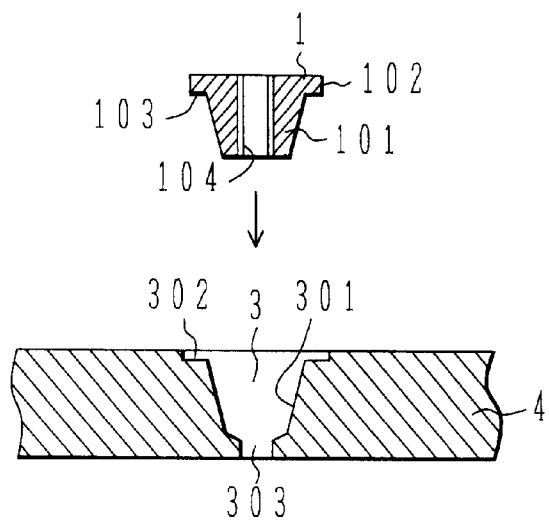
FIGS. 10A, 10B and 10C are representations of steps for explaining a second example of the screw-fastening structure of two fastened members using the taper nut according to the first embodiment of the present invention.

Steps of a second example for screwing two fastened members by using the taper nut according to the first embodiment of the present invention will now be described with reference to FIGS. 10A–10C.

In the screw-fastening structure shown in FIG. 5, the second fastened member is fastened to the side of the first fastened member opposite to the side where the taper portions of all the holes are opened. By contrast, in this example, the second fastened member is fastened to the side of the first fastened member where the taper portions of all the holes are opened.

As described above in connection with FIG. 5A, a hole into which the taper nut is to be fitted is bored in the fastened member 4 made of an aluminum alloy by using the forming drill 2'. Thus, as shown in FIG. 10A, the hole 3 is bored in the fastened member 4 by drilling. The hole 3 comprises the hole taper portion 301, the hole step portion 302, and the male screw guide portion 303. The taper nut 1 made of stainless steel is fitted into the hole 3. As described above in connection with FIG. 1 or 2, the taper nut 1 comprises the taper portion 101, the flange portion 102, and the female threads 104.

Here, the hole step portion 302 of the hole 3 is formed to have a depth smaller than the thickness of the flange portion 102 of the taper nut 1.

The taper portion 101 of the taper nut 1 is so sized as to lightly tight-fit into the hole taper portion 301 of the hole 3 when fitted.

Figure 10B:
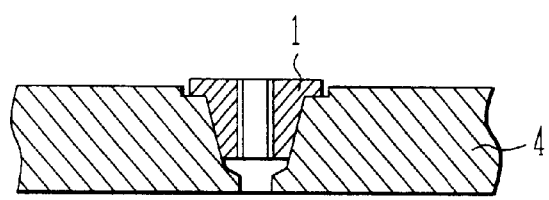

By hitting the upper surface of the flange portion 102 of the taper nut 1 after inserting the taper nut 1 into the hole 3, the taper nut 1 is driven into the hole 3 of the fastened member 4 and then stopped when the flange portion 102 comes into abutment against the hole step portion 302, as shown in FIG. 10B. Also, in this state, the upper surface of the flange portion 102 of the taper nut 1 projects upward of the surface of the first fastened member 4.

Since the hole taper portion 301 of the hole 3 and the taper portion 101 of the taper nut 1 engage each other, the axis of the hole 3 and the axis of the taper nut 1 are aligned with each other. By forming the hole 3 in rectangular relation to the surface of the fastened member 4, therefore, the axis of the taper nut 1 also lies perpendicularly to the surface of the fastened member 4. Thus, by tapping the female threads 104 through the taper nut 1 to have an axis aligned with the axis of the taper portion 101 of the taper nut 1, it is possible to easily position the axis of the female threads 104 in rectangular relation to the surface of the fastened member 4.

Further, with the flange portion 102 provided at the top of the taper nut 1, the taper nut 1 is surely stopped upon the lower surface 103 of the flange portion 102 of the taper nut 1 abutting against the hole step portion 302 of the hole 3. If the flange portion 102 is not provided, the taper nut 1 would be thrust into the hole 3 and the hole 3 of the fastened member 4 would be greatly deformed because the fastened member 4 made of an aluminum alloy is softer than the taper nut 1 made of stainless steel. By contrast, with the flange portion 102 provided on the taper nut 1 in this embodiment, it is possible to prevent the taper nut 1 from overly thrusting into the hole 3 and hence prevent the hole 3 from deforming.

In the state shown in FIG. 10B, the taper nut 1 is fixedly held on the fastened member 4 by frictional forces.

Figure 10C:
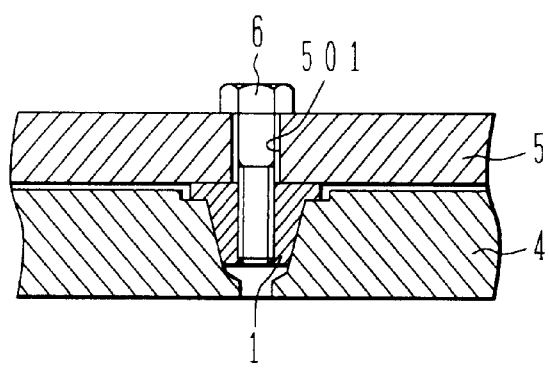

Next, as shown in FIG. 10C, when a second fastened member 5 having a hole 501 bored therethrough is fastened to the first fastened member 4, the second fastened member 5 is placed adjacent the surface of the first fastened member 4 into which the taper nut 1 has been implanted, and the two members are tightly joined together by using a male screw 6. In the case of the first fastened member 4 being made of an aluminum alloy, the second fastened member 5 is, e.g., a printed board on which circuit devices are mounted. Since the male screw 6 imposes a load on the taper unit 1 in the direction to tighten the taper-fit, there is no risk that the taper nut 1 may be loosened from the first fastened member 4.

The screw-fastening structure of this example has the strength (several 10 kg even with a male screw of type M4) corresponding to the frictional forces by which the driven taper nut is fixedly held in the hole. To enhance the fastening strength in this example, it is effective to increase the number of fastening points. Particularly, because the second fastened member 5 is floated from the first fastened member 4 due to the taper nut 1 projecting from the surface of the first fastened member 4, the taper nut 1 is relatively easily susceptible to force urging it upward in such a floating condition, and may be readily dislodged from the hole 3 if the two fastened members are fastened together by using only one taper nut. That disadvantage can be prevented by using a plurality of, preferably, three or more, taper nuts. The use of plural taper nuts is also effective to determine a fixed plane and stabilize it.

It is also important to enlarge the tight-fit allowance. While the tight-fit allowance is set to range from 2 to 20% of the diameter of the taper portion in the example shown in FIG. 5, a lower limit value is preferably raised in this example to such an extent that the tight-fit allowance falls in the range of 4 to 20% thereof.

In this screw-fastening structure, if the hole step portion 302 of the hole 3 is set deeper than the thickness of the flange portion 102, this would not be preferable because force tending to withdraw the taper nut acts on it when the male screw 6 is tightened into the taper nut. Additionally, the male screw guide hole 303 shown in FIG. 10 is not always required. But if the male screw guide hole 303 is bored where possible, this is advantageous in that the forming drills 2, 2' described in connection with FIGS. 3 and 9A–9B can be used as they are.

As described above, by using the taper nut of this embodiment, the working efficiency can be improved.

Also, the female threads tapped through the taper nut can be easily prevented from offsetting from coaxial relation to the hole of the fastened member.

Further, the fixing force to hold the taper nut in the hole can be kept constant.

Moreover, by drilling the fastened member using the forming drill, control of the tight-fit allowance is facilitated.

It is also possible to prevent deformation of the hole 3.

In addition, the taper nut can be easily attached and detached, enabling it to be easily replaced. Therefore, the fastened member and the taper nut which are made of different materials can be discarded separately from each other.

Furthermore, the removed taper nut can be reused.

The taper nut of this embodiment is adaptable for small male screws as well.

By employing the driving hammer according to this embodiment, it is possible to prevent the fastened member from being damaged and to simplify the driving operation.

By employing the automatic driving system according to this embodiment, the driving operation can also be easily automated.

Figure 11:
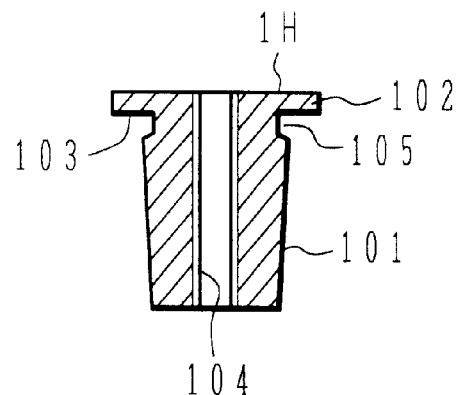
FIG. 11 is a vertical sectional view of a taper nut according to a second embodiment of the present invention.

A taper nut as one example of a taper implant with female threads according to a second embodiment of the present invention will now be described with reference to FIGS. 11 and 12. Note that the same reference numerals as in FIG. 1 denote the same portions.

A taper nut 1H as one example of the taper implant with female threads according to this embodiment comprises a taper portion 101, a flange portion 102, and female threads 104 tapped through the taper nut 1H, as with the taper nut described above in connection with FIG. 1. In addition, the taper nut 1H further comprises a groove portion 105 formed at an end of the taper portion 101 on the larger-diameter side. The groove portion 105 is cylindrical in shape and formed in an outer peripheral surface of the taper nut 1H.

In a like manner as described above in connection with FIG. 5, the taper nut 1H is inserted into a hole bored in one fastened member by using a forming drill and then driven into the hole by using a driving hammer or the like.

Figure 12:
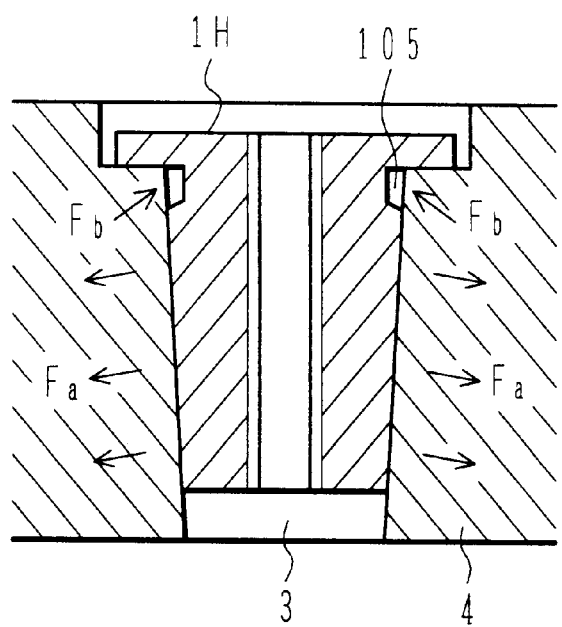
FIG. 12 is an illustration for explaining joining forces developed by the taper nut according to the second embodiment of the present invention.

FIG. 12 shows a state that the taper nut 1H according to this embodiment is inserted into a hole 3 bored in one fastened member 4. When the taper nut 1H is dropped into the hole 3, a lower surface 103 of the flange portion 102 is floated from a hole step portion of the hole 3. When the taper nut 1H is driven into the hole 3 from such a condition by using a hammer or the like, forces Fa act on the fastened member 4 from the taper nut 1H. Further, in this embodiment, the taper nut 1H includes the groove portion 105 formed at the end of the taper nut 1H on the larger-diameter side. Accordingly, upon the taper nut 1 being driven, forces Fb act on the groove portion 105 so that a portion of the fastened member 4 facing the groove portion 105 is elastically deformed and the thus-deformed portion engages in the groove portion 105. As a result, the joining force between the taper nut 1H and the fastened member 4 can be increased as compared with the joining force obtained by the taper nut shown in FIG. 1.

As described above, by using the taper nut of this embodiment, the working efficiency can be improved.

Also, the joining force between the taper nut and the fastened member can be increased. The female threads tapped through the taper nut can be easily prevented from offsetting from coaxial relation to the hole of the fastened member. The fixing force to hold the taper nut in the hole can be kept constant. Deformation of the hole can be prevented.

Further, the taper nut can be easily attached and detached, enabling it to be easily replaced. Therefore, the fastened member and the taper nut which are made of different materials can be discarded separately from each other. The removed taper nut can be reused. The taper nut of this embodiment is adaptable for small male screws as well.

Figure 13:
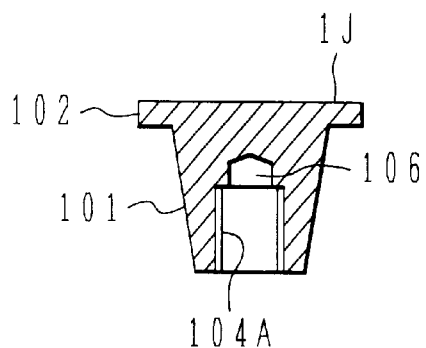
FIG. 13 is a vertical sectional view of a taper nut according to a third embodiment of the present invention.

A taper nut as one example of a taper implant with female threads according to a third embodiment of the present invention will now be described with reference to FIG. 13. Note that the same reference numerals as in FIG. 1 denote the same portions.

A taper nut 1J as one example of the taper implant with female threads according to this embodiment comprises a taper portion 101 and a flange portion 102 as with the taper nut described above in connection with FIG. 1. But, in this embodiment, a threaded hole 106 having female threads 104A formed in its inner wall surface is bored as a blind hole.

In a like manner as described above in connection with FIG. 5, the taper nut 1J is inserted into a hole bored in one fastened member by using a forming drill and then driven into the hole by using a driving hammer or the like.

Since the threaded hole 106 is not penetrating the taper nut 1J, this embodiment is suitably employed for fastening, in particular, vacuum devices and units. In other words, a vacuum is satisfactorily sustained by the taper portion 101 and the flange portion 102 both held in close contact with the hole.

As described above, by using the taper nut of this embodiment, the working efficiency can be improved.

Also, vacuum devices and units can be easily fastened while sustaining a vacuum. The female threads tapped in the taper nut can be easily prevented from offsetting from coaxial relation to the hole of the fastened member. The fixing force to hold the taper nut in the hole can be kept constant. Deformation of the hole can be prevented.

Further, the taper nut can be easily attached and detached, enabling it to be easily replaced. Therefore, the fastened member and the taper nut which are made of different materials can be discarded separately from each other. The removed taper nut can be reused. The taper nut of this embodiment is adaptable for small male screws as well.

A taper nut as one example of a taper implant with female threads according to a fourth embodiment of the present invention will now be described with reference to FIG. 14. Note that the same reference numerals as in FIG. 1 denote the same portions.

A taper nut 1K as one example of the taper implant with female threads according to this embodiment comprises a taper portion 101, a flange portion 102, and female threads 104 tapped in the taper nut 1K, as with the taper nut described above in connection with FIG. 1. Further, in this embodiment, a threaded hole having the female threads 104 is counterbored to form a counterbored portion 107 at an end face of the taper portion 101 on the smaller-diameter side.

The longer the threaded hole, the longer time is required to tighten a male screw. By counterboring the female threads 104 halfway like this embodiment, the length of the threaded hole is reduced. Accordingly, the male screw can be tightened in a shorter time. From the viewpoint of ensuring the screw-fastening strength, it is desired that the remaining length of the female threads 104 be 0.8 or more time(s) the diameter d0 of the male screw.

As described above, by using the taper nut of this embodiment, the working efficiency can be improved.

Also, a time required for tightening the male screw can be cut down. The female threads tapped in the taper nut can be easily prevented from offsetting from coaxial relation to the hole of the fastened member. The fixing force to hold the taper nut in the hole can be kept constant. Deformation of the hole can be prevented.

Further, the taper nut can be easily attached and detached, enabling it to be easily replaced. Therefore, the fastened member and the taper nut which are made of different materials can be discarded separately from each other. The removed taper nut can be reused. The taper nut of this embodiment is adaptable for small male screws as well.

Figure 15:
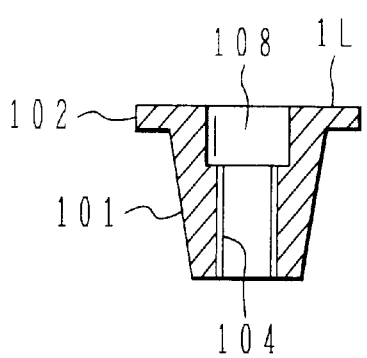
FIG. 15 is a vertical sectional view of a taper nut according to a fifth embodiment of the present invention.

A taper nut as one example of a taper implant with female threads according to a fifth embodiment of the present invention will now be described with reference to FIG. 15. Note that the same reference numerals as in FIG. 1 denote the same portions.

A taper nut 1L as one example of the taper implant with female threads according to this embodiment comprises a taper portion 101, a flange portion 102, and female threads 104 tapped in the taper nut 1K, as with the taper nut described above in connection with FIG. 1. Further, in this embodiment, a threaded hole having the female threads 104 is counterbored to form a counterbored portion 108 at an end face of the threaded hole on the side of the flange portion 102.

By thus counterboring the female threads 104 halfway, the length of the threaded hole is reduced. Accordingly, the male screw can be tightened in a shorter time. From the viewpoint of ensuring the screw-fastening strength, it is desired that the remaining length of the female threads 104 be 0.8 or more time(s) the diameter d0 of the male screw.

Figure 14:
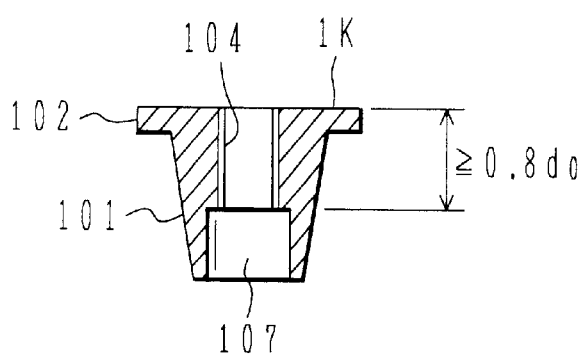
FIG. 14 is a vertical sectional view of a taper nut according to a fourth embodiment of the present invention.

As described above, by using the taper nut of this embodiment, similar advantages to those obtainable with the taper nut shown in FIG. 14 can be achieved.

A reference pin as one example of a taper implant with female threads according to a sixth embodiment of the present invention will now be described with reference to FIGS. 16 and 17. Note that the same reference numerals as in FIG. 1 denote the same portions.

Figure 16:
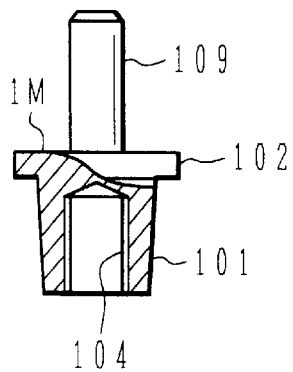
FIG. 16 is a side view, partly vertically sectioned, of a reference pin according to a sixth embodiment of the present invention.

As shown in FIG. 16, a reference pin 1M as one example of the taper implant with female threads according to this embodiment comprises a taper portion 101, a flange portion 102, and female threads 104 tapped in the reference pin 1M, as with the taper nut described above in connection with FIG. 13. Further, in this embodiment, a positioning pin 109 is provided on an end face of the reference pin 1M on the side of the flange portion 102. The positioning pin 109 has an axis aligned with the axis of the taper portion 101. In other words, the positioning pin 109 serve as a coaxial fit portion extending in the axial direction of the taper portion 101.

Figure 17:
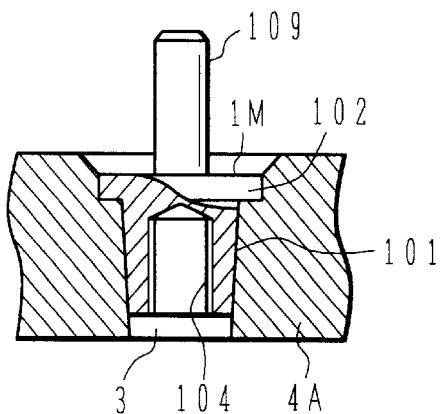
FIG. 17 is a partial vertical sectional view showing the reference pin, in its driven state, according to the sixth embodiment of the present invention.

As shown in FIG. 17, a hole 3 as described above in connection with FIG. 4 is bored in a base member 4A by using a forming drill. In a like manner as described above in connection with FIG. 5, the reference pin 1M is inserted into the hole 3 bored in the base member 4A by using a forming drill and then driven into the hole 3 by using a driving hammer or the like. The driving hammer used here has a piston so configured as to make driving force act on the flange portion 102 of the reference pin 1M. Accordingly, the driving force will not act on the positioning pin 109 and hence the positioning pin 109 is prevented from deforming.

The reference pin 1M is fixedly held on the base member 4A by frictional forces between the hole 3 and the reference pin 1M driven into the hole 3. The height of the positioning pin 109 can be easily specified by the presence of the flange portion 102 of the reference pin 1M.

With engagement between the taper portion 101 of the reference pin 1M and a hole taper portion 301 of the hole 3, the accuracy of erectness of the positioning pin 109 provided on the reference pin 1M can be easily improved.

Also, while instable reaming finish of a fit hole has been required in the past for right erection of the positioning pin 109, this embodiment needs no longer such reaming finish.

Further, since the reference pin 1M has the flange portion 102, it is possible to prevent the reference pin from overly thrusting into the hole and hence prevent the hole from deforming. In addition, the reference pin 1M can be easily disengaged from the hole 3.

As described above, by using the reference pin of this embodiment, the working efficiency can be improved.

Also, the accuracy of erectness of the positioning pin can be easily improved. Because the reference pin can be fixed by a bolt tightened into the female threads from the rear side, the force of fixing the reference pin in place can be increased. Reaming finish is no longer required to rightly erect the positioning pin. The fixing force to hold the reference pin in the hole can be kept constant.

Further, the reference pin can be easily attached and detached, enabling it to be easily replaced. Therefore, the fastened member and the reference pin which are made of different materials can be discarded separately from each other. The removed reference pin can be reused.

Figure 18:
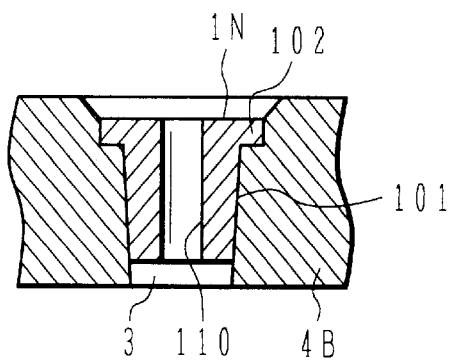
FIG. 18 is a partial vertical sectional view showing a taper implant with a positioning hole, in its driven state, according to a seventh embodiment of the present invention.

A taper implant with a positioning hole according to a seventh embodiment of the present invention will now be described with reference to FIG. 18. Note that the same reference numerals as in FIG. 1 denote the same portions.

A taper implant 1N with a positioning hole according to this embodiment is employed in pair with the reference pin 1M shown in FIG. 17. The taper implant 1N with a positioning hole comprises a taper portion 101 and a flange portion 102 as with the taper nut described above in connection with FIG. 1. Further, in this embodiment, a positioning hole 110 is bored through the taper implant 1N. The positioning hole 110 has an axis aligned with the axis of the taper portion 101. In other words, the positioning hole 110 serves as a coaxial fit portion extending in the axial direction of the taper portion 101.

A hole 3 as described above in connection with FIG. 4 is bored in a base member 4B by using a forming drill. In a like manner as described above in connection with FIG. 5, the taper implant 1N with a positioning hole is inserted into the hole 3 bored in the base member 4B by using a forming drill and then driven into the hole 3 by using a driving hammer or the like. The taper implant 1N with a positioning hole is fixedly held on the base member 4B by frictional forces between the hole 3 and the taper implant 1N driven into the hole 3.

A process for positioning two base members by using both the taper implant with a positioning pin according to the sixth embodiment of the present invention and the taper implant with a positioning hole according to the seventh embodiment of the present invention will now be described with reference to FIGS. 19A–19C.

FIG. 19A shows the same state as described above in connection with FIG. 17 in which the reference pin 1M with the positioning pin 109 is driven into the hole of the base member 4A.

FIG. 19C shows the same state as described above in connection with FIG. 18 in which the taper implant 1N with the positioning hole 110 is driven into the hole of the base member 4B.

FIG. 19B shows a state in which the base members 4A and 4B are positioned to each other by inserting the positioning pin 109 of the reference pin 1M into the positioning hole 110 of the taper implant 1N. Such simple insertion enables both the base members 4A and 4B to be positioned to each other.

In this respect, by boring the positioning hole 110 in the taper implant 1N with high precision to form the hole having small tolerance, the positioning accuracy between the two base members can be improved.

According to this embodiment, it is possible to easily position the two base members.

A manner of changing tolerance of the positioning hole formed in the taper implant with a positioning hole according to the seventh embodiment of the present invention will be described with reference to FIGS. 20A–20B.

FIG. 20A shows, by way of example, the same state as described above in connection with FIG. 18 in which the taper implant 1N with the positioning hole 110 is driven into the hole of the base member 4B. Here, it is assumed that the diameter of the positioning hole 110 is D mm and the tolerance thereof is in the range of +0.02 mm to +0.03 mm. In the taper implant 1N of this embodiment, the taper portion of the taper implant 1N can be easily disengaged from the hole taper portion of the hole bored in the base member 4B by hitting the end face of the taper portion on the smaller-diameter side. Further, because the taper implant 1N has the flange portion, it is prevented from overly thrusting into the hole bored in the base member 4B and hence the hole is essentially prevented from deforming. Accordingly, after removing the taper implant 1N which has been once driven into the hole, it is easy to drive another taper implant into the same hole.

FIG. 20B shows, by way of example, a state that a taper implant 1N' with a positioning hole 110A is driven into the hole of the base member 4B. Here, by employing the taper implant 1N' wherein the diameter of the positioning hole 110A is D mm and the tolerance thereof is in the range of +0.01 mm to +0.02 mm, the tolerance of the positioning hole 110 can be easily changed. With change in the tolerance of the positioning hole 110, the positioning accuracy can also be easily changed.

Figure 21:
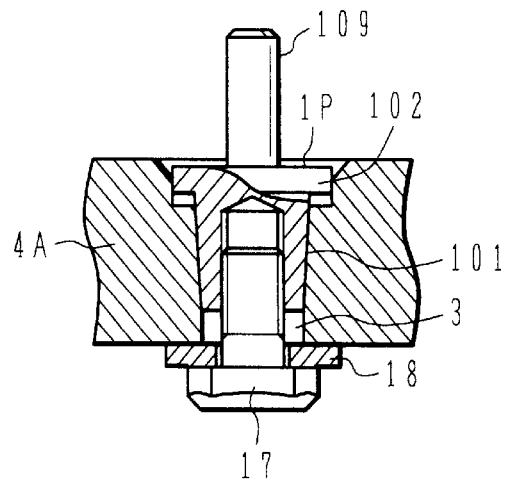
FIG. 21 is a partial vertical sectional view showing a reference pin, in its joined state, according to an eighth embodiment of the present invention.

A reference pin as one example of a taper implant with a positioning pin according to an eighth embodiment of the present invention will now be described with reference to FIG. 21. Note that the same reference numerals as in FIG. 17 denote the same portions.

A reference pin 1P as one example of the taper implant with a positioning pin according to this embodiment comprises a taper portion 101, a flange portion 102, female threads 104 tapped in the reference pin 1P, and a positioning pin 109, as with the reference pin described above in connection with FIG. 16.

After the reference pin 1P is inserted into the hole 3 bored in the base member 4A by using a forming drill in a like manner as described above in connection with FIG. 5, a bolt 17 is tightened into the female threads 104 through a washer 18 from the rear side of the base member 4A. In other words, the reference pin 1P is pulled into the hole 3 by tightening the bolt 17 and, therefore, deformation of the positioning pin 109 is prevented.

Since the reference pin 1P is fixedly held on the base member 4A by frictional forces between the hole 3 and the reference pin 1P pulled into the hole 3 and tightening force of the bolt 17, the joining strength between the reference pin and the base member can be increased as compared with the structure shown in FIG. 16.

As described above, by using the reference pin of this embodiment, the working efficiency can be improved.

Also, the fixing force to hold the reference pin in the hole can be increased. The accuracy of erectness of the positioning pin can be easily improved. Reaming finish is no longer required to rightly erect the positioning pin.

Further, the reference pin can be easily attached and detached, enabling it to be easily replaced. Therefore, the fastened member and the reference pin which are made of different materials can be discarded separately from each other. The removed reference pin can be reused.

Figure 22:
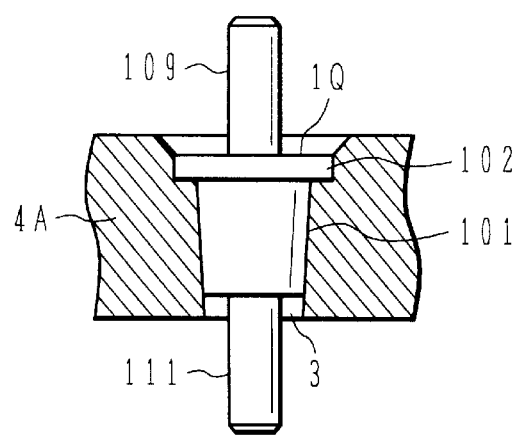
FIG. 22 is a partial vertical sectional view showing a reference pin, in its driven state, according to a ninth embodiment of the present invention.

A reference pin as one example of a taper implant with a positioning pin according to a ninth embodiment of the present invention will now be described with reference to FIG. 22. Note that the same reference numerals as in FIG. 17 denote the same portions.

A reference pin 1Q as one example of the taper implant with a positioning pin according to this embodiment comprises a taper portion 101 and a flange portion 102. Further, in this embodiment, a positioning pin 109 is provided at an end face of the reference pin 1Q on the side of the flange portion 102, and a positioning pin 111 is provided at an end face of the taper portion 101 on the smaller-diameter side. The positioning pins 109, 111 have respective axes aligned with the axis of the taper portion 101. In other words, the positioning pins 109, 111 each serve as a coaxial fit portion extending in the axial direction of the taper portion 101.

A hole 3 as described above in connection with FIG. 4 is bored in a base member 4A by using a forming drill. In a like manner as described above in connection with FIG. 5, the reference pin 1Q is inserted into the hole 3 bored in the base member 4A by using a forming drill and then driven into the hole 3 by using a driving hammer or the like. The driving hammer used here has a piston so configured as to make a driving force act on the flange portion 102 of the reference pin 1Q. Accordingly, the driving force will not act on the positioning pin 109 and hence the positioning pin 109 is prevented from deforming.

The reference pin 1Q is fixedly held on the base member 4A by frictional forces between the hole 3 and the reference pin 1Q driven into the hole 3. The heights of the positioning pins 109, 111 are specified by the presence of the flange portion 102 of the reference pin 1Q.

As described above, by using the reference pin of this embodiment, the working efficiency can be improved.

Also, positioning of three base members can be easily achieved. The accuracy of erectness of the positioning pin can be easily improved. Reaming finish is no longer required to rightly erect the positioning pin.

Further, the reference pin can be easily attached and detached, enabling it to be easily replaced. Therefore, the fastened member and the reference pin which are made of different materials can be discarded separately from each other. The removed reference pin can be reused.

Figure 23:
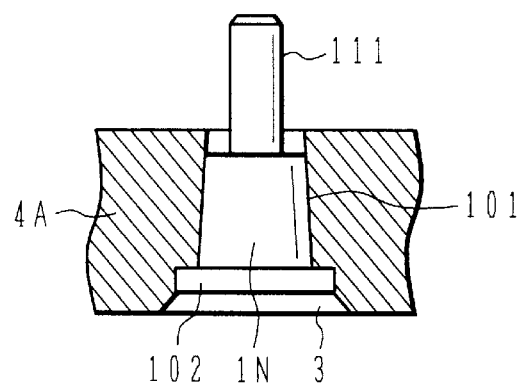
FIG. 23 is a partial vertical sectional view showing a reference pin, in its driven state, according to a tenth embodiment of the present invention.

The structure of a reference pin as one example of a taper implant with a positioning pin according to a tenth embodiment of the present invention will now be described with reference to FIG. 23. Note that the same reference numerals as in FIG. 17 denote the same portions.

A reference pin 1N as one example of the taper implant with a positioning pin according to this embodiment comprises a taper portion 101 and a flange portion 102 as with the reference pin described above in connection with FIG. 16. Further, in this embodiment, a positioning pin 111 is provided at an end face of the taper portion 101 on the smaller-diameter side.

In a like manner as described above in connection with FIG. 5, the reference pin 1N is inserted into a hole 3 bored in a base member 4A by using a forming drill and then driven into the hole 3 by using a driving hammer or the like. The hole 3 is drilled from the rear side of the base member 4A. Therefore, the reference pin 1N is driven into the hole 3 from the rear side of the base member 4A such that the positioning pin 111 is projected outward from the front side of the base member 4A. This structure makes the reference pin 1N less easily separable from the hole 3.

As described above, by using the reference pin of this embodiment, the working efficiency can be improved.

Also, the reference pin is less easily separable from the hole. The accuracy of erectness of the positioning pin can be easily improved. Reaming finish is no longer required to rightly erect the positioning pin.

Further, the reference pin can be easily attached and detached, enabling it to be easily replaced. Therefore, the fastened member and the reference pin which are made of different materials can be discarded separately from each other. The removed reference pin can be reused.

Figure 24:
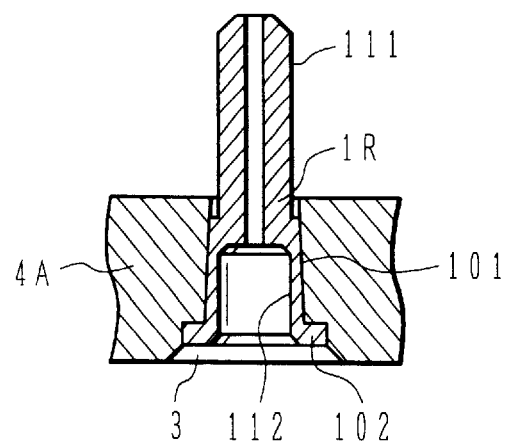
FIG. 24 is a partial vertical sectional view showing a reference pin, in its driven state, according to an eleventh embodiment of the present invention.

The structure of a reference pin as one example of a taper implant with a positioning pin according to an eleventh embodiment of the present invention will now be described with reference to FIG. 24. Note that the same reference numerals as in FIG. 17 denote the same portions.

A reference pin 1R as one example of the taper implant with a positioning pin according to this embodiment comprises a taper portion 101, a flange portion 102, and a positioning pin 111 provided at an end face of the taper portion 101 on the smaller-diameter side, as with the reference pin described above in connection with FIG. 23. Further, in this embodiment, a reference pin hole 112 is formed in an end face of the reference pin 1R on the side of the flange portion 102. The reference pin hole 112 has an inner diameter allowing a positioning pin 111 provided on another taper implant to be inserted to the hole 112.

In a like manner as described above in connection with FIG. 5, the reference pin 1R is inserted into a hole 3 bored in a base member 4A by using a forming drill and then driven into the hole 3 by using a driving hammer or the like. The hole 3 is drilled from the rear side of the base member 4A. Therefore, the reference pin 1R is driven into the hole 3 from the rear side of the base member 4A such that the positioning pin 111 is projected outward from the front side of the base member 4A. In addition, the reference pin hole 112 of the reference pin 1R is made open to the rear side of the base member 4A. Accordingly, by driving another reference pin 1R into another base member in a like manner as shown in FIG. 24 and then inserting the positioning pin 111 of the other reference pin 1R, which has been thus driven into the other base member, into the reference pin hole 112 of the reference pin 1R driven into the base member 4A, the base member 4A and the other base member can be easily positioned with respect to each other. In other words, because the reference pin 1R has both the positioning pin and the reference pin hole, the number of reference pins required for positioning two base members can be reduced.

As described above, by using the reference pin of this embodiment, the working efficiency can be improved.

Also, the number of reference pins required for positioning two base members can be reduced. Since the joining strength between the reference pin and the base member is increased, they are less easily separable from each other. The accuracy of erectness of the positioning pin can be easily improved. Reaming finish is no longer required to rightly erect the positioning pin.

Further, the reference pin can be easily attached and detached, enabling it to be easily replaced. Therefore, the fastened member and the reference pin which are made of different materials can be discarded separately from each other. The removed reference pin can be reused.

The structure of a reference pin as one example of a taper implant with a positioning pin according to a twelfth embodiment of the present invention will now be described with reference to FIG. 25. Note that the same reference numerals as in FIG. 17 denote the same portions.

A reference pin 1S as one example of the taper implant with a positioning pin according to this embodiment comprises a taper portion 101 and female threads 104 tapped in the taper portion 101 as with the reference pin described above in connection with FIG. 16. Further, in the reference pin 1S of this embodiment, a positioning pin 113 having a larger diameter than the taper portion 101 is provided at an end face of the taper portion 101 on the larger-diameter side. Because the positioning pin 113 has a larger diameter than the taper portion 101, a lower end face 113A of the positioning pin 113 has the same function as the lower surface 103 of the flange portion 102 of the taper nut shown in FIG. 1.

The reference pin 1S is inserted into a hole 3A bored in a base member 4A by using a drill having a taper portion drilling bit and then driven into the hole 3A by using a driving hammer or the like. The lower end face 113A of the positioning pin 113 engages the surface of the base member 4A to thereby prevent the reference pin 1S from further thrusting into the hole 3A. The top of the positioning pin 113 is hit by the hammer when the reference pin 1S is driven, but the positioning pin 113 will not deform because it has a larger diameter than the positioning pin 109 shown in FIG. 16.

Further, a counterbored hole 19 is formed on the rear side of the base member 4A. A bolt 17 is tightened into the female threads 104 through a washer 18 from the rear side of the base member 4A. Thus, since the reference pin 1S is fixedly held on the base member 4A by frictional forces between the hole 3A and the reference pin 1S driven into the hole 3A and tightening force of the bolt 17, the joining strength between the reference pin and the base member can be increased as compared with the structure shown in FIG. 16. The reason of increasing the joining strength is to surely prevent a loosening of the reference pin 1S in view of that the reference pin 1S tends to more easily loosen because the positioning pin 113 has a larger diameter and is subjected to larger force.

As described above, by using the reference pin of this embodiment, the working efficiency can be improved.

Also, the joining strength between the reference pin and the base member can be increased and hence they are less easily separable from each other. The accuracy of erectness of the positioning pin can be easily improved. Reaming finish is no longer required to rightly erect the positioning pin.

Further, the reference pin can be easily attached and detached, enabling it to be easily replaced. Therefore, the fastened member and the reference pin which are made of different materials can be discarded separately from each other. The removed reference pin can be reused.

Figure 26:
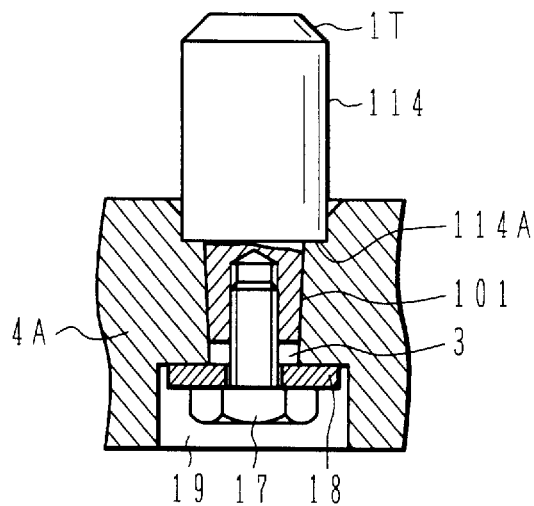
FIG. 26 is a partial vertical sectional view showing a reference pin, in its driven state, according to a thirteenth embodiment of the present invention.

The structure of a reference pin as one example of a taper implant with a positioning pin according to a thirteenth embodiment of the present invention will now be described with reference to FIG. 26. Note that the same reference numerals as in FIG. 17 denote the same portions.

A reference pin 1T as one example of the taper implant with a positioning pin according to this embodiment comprises a taper portion 101 and female threads 104 tapped in the taper portion 101 as with the reference pin described above in connection with FIG. 16. Further, in the reference pin 1T of this embodiment, a positioning pin 114 having a larger diameter than the taper portion 101 is provided at an end face of the taper portion 101 on the larger-diameter side. Because the positioning pin 114 has a larger diameter than the taper portion 101, a lower end face 114A of the positioning pin 114 has the same function as the lower surface 103 of the flange portion 102 of the taper nut shown in FIG. 1. Incidentally, the diameter of the positioning pin 114 is smaller than the diameter of the positioning pin 109 shown in FIG. 25.

In a like manner as described above in connection with FIG. 5, the reference pin 1T is inserted into a hole 3 bored in a base member 4A by using a forming drill and then driven into the hole 3 by using a driving hammer or the like. The lower end face 114A of the positioning pin 114 engages a hole step portion of the hole 3 to thereby prevent the reference pin 1T from further thrusting into the hole 3. The top of the positioning pin 114 is hit by the hammer when the reference pin 1T is driven, but the positioning pin 114 will not deform because it has a larger diameter than the positioning pin 109 shown in FIG. 16.

Further, a counterbored hole 19 is formed on the rear side of the base member 4A. A bolt 17 is tightened into the female threads 104 through a washer 18 from the rear side of the base member 4A. Thus, since the reference pin 1T is fixedly held on the base member 4A by frictional forces between the hole 3 and the reference pin 1T driven into the hole 3 and tightening force of the bolt.17, the joining strength between the reference pin and the base member can be increased as compared with the structure shown in FIG. 16. The reason of increasing the joining strength is to surely prevent a loosening of the reference pin 1T in view of that the reference pin 1T tends to more easily loosen because the positioning pin 114 has a larger diameter and is subjected to larger force.

Figure 25:
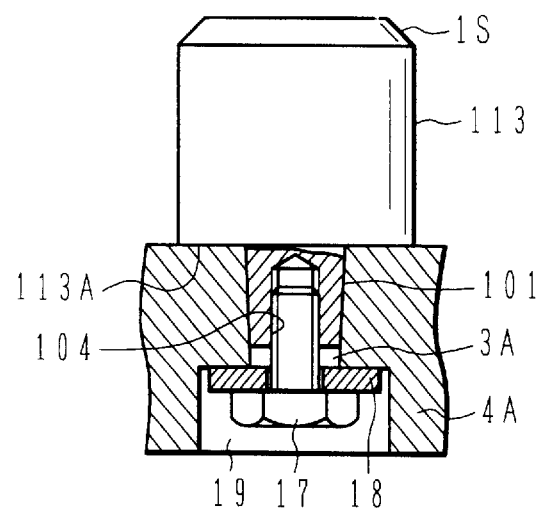
FIG. 25 is a partial vertical sectional view showing a reference pin, in its driven state, according to a twelfth embodiment of the present invention.

As described above, by using the reference pin of this embodiment, similar advantages to those obtainable with the reference pin shown in FIG. 25 can be achieved.

A taper implant with a guide bar according to a fourteenth embodiment of the present invention will now be described with reference to FIGS. 27A–27B. Note that the same reference numerals as in FIG. 1 denote the same portions.

Figure 27A:
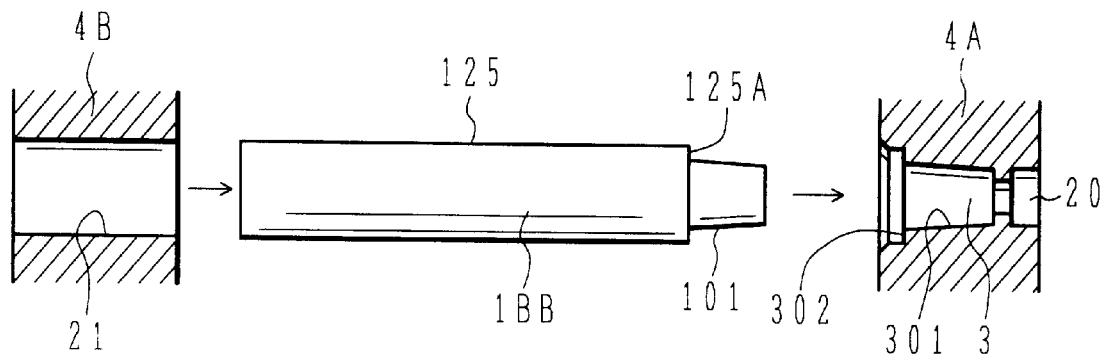
FIGS. 27A and 27B are partial vertical sectional views showing steps of driving a taper implant with a guide bar according to a fourteenth embodiment of the present invention.

As shown in FIG. 27A, a reference pin 1BB as one example of the taper implant with a guide bar according to this embodiment comprises a taper portion 101 and female threads (not shown) tapped in the taper portion 101 as with the reference pin described above in connection with FIG. 16. Further, in the reference pin 1BB of this embodiment, a guide bar 125 having a larger diameter than the taper portion 101 is provided at an end face of the taper portion 101 on the larger-diameter side. The guide bar 125 has an axis aligned with the axis of the taper portion 101. In other words, the guide bar 125 serve as a coaxial fit portion extending in the axial direction of the taper portion 101. Because the guide bar 125 has a larger diameter than the taper portion 101, a lower end face 125A of the guide bar 125 has the same function as the lower surface 103 of the flange portion 102 of the taper nut shown in FIG. 1.

On the other hand, a hole 3 is bored in a first base member 4A by using a forming drill as described above in connection with FIG. 4. The hole 3 has a hole taper portion 301 and a hole step portion 302. A counterbored hole 20 is formed at one end of the hole 3 on the rear side of the base member 4A. Additionally, a through hole 21 into which the guide bar 125 can be inserted is bored through a second base member 4B.

Figure 27B:
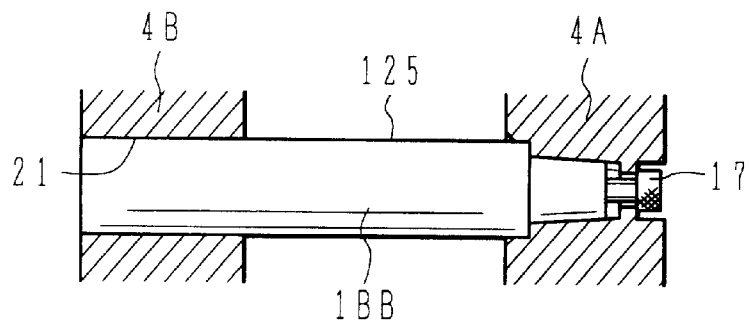

As shown in FIG. 27B, the reference pin 1BB is inserted into the hole 3 bored in the base member 4A by using a forming drill and then driven into the hole 3 by using a driving hammer or the like. The lower end face 125A of the guide bar 125 engages the hole step portion of the hole 3 to thereby prevent the reference pin 1BB from further thrusting into the hole 3. The top of the guide bar 125 is hit by the hammer when the reference pin 1BB is driven, but the guide bar 125 will not deform because it has a larger diameter than the positioning pin 109 shown in FIG. 16.

Further, a bolt 17 is tightened into the female threads in the reference pin 1BB from the rear side of the base member 4A. Thus, since the reference pin 1BB is fixedly held on the base member 4A by frictional forces between the hole 3 and the reference pin 1BB driven into the hole 3 and tightening force of the bolt 17, the joining strength between the reference pin and the base member can be increased as compared with the structure shown in FIG. 16.

Then, the guide bar 125 of the reference pin 1BB is inserted into the through hole 21 of the base member 4B. Accordingly, the base member 4B is axially slidable with respect to the base member 4A while an outer peripheral surface of the guide bar 125 serves as a sliding surface.

As described above, by using the reference pin of this embodiment, the working efficiency can be improved.

Also, the accuracy of erectness of the positioning pin can be easily improved. The fixing force to hold the reference pin in the hole can be kept constant.

Further, the reference pin can be easily attached and detached, enabling it to be easily replaced. Therefore, the fastened member and the reference pin which are made of different materials can be discarded separately from each other. The removed reference pin can be reused.

A taper implant with a tension spring post according to a fifteenth embodiment of the present invention will now be described with reference to FIG. 28. Note that the same reference numerals as in FIG. 17 denote the same portions.

A taper implant 1U with a tension spring post according to this embodiment comprises a taper portion 101 and a flange portion 102 as with the taper nut described in connection with FIG. 1. Further, in this embodiment, a tension spring post 115 is provided at an end face of the taper implant 1U on the side of the flange portion 102. The tension spring post 115 has an axis aligned with the axis of the taper portion 101. In other words, the tension spring post 115 serves as a coaxial fit portion extending in the axial direction of the taper portion 101. A hole 116 for attachment of one end of a tension spring is formed in the tension spring post 115 near its distal end.

A hole 3 as described above in connection with FIG. 4 is bored in a base member 4A by using a forming drill. In a like manner as described above in connection with FIG. 5, the taper implant 1U with a tension spring post is inserted into the hole 3 bored in the base member 4A by using a forming drill and then driven into the hole 3 by using a driving hammer or the like. The driving hammer used here has a piston so configured as to make driving force act on the flange portion 102 of the taper implant 1U with a tension spring post. Accordingly, the driving force will not act on the tension spring post 115 and hence the tension spring post 115 is prevented from deforming.

The taper implant 1U with a tension spring post is fixedly held on the base member 4A by frictional forces between the hole 3 and the taper implant 1U driven into the hole 3. The height of the tension spring post 115 is specified by the presence of the flange portion 102 of the taper implant 1U with a tension spring post.

By attaching one end of the tension spring to the hole 116, the tension spring can be fixed to the post 115 at one end thereof.

As described above, by using the taper implant of this embodiment, the working efficiency can be improved.

Further, the taper implant can be easily attached and detached, enabling it to be easily replaced. Therefore, the fastened member and the taper implant which are made of different materials can be discarded separately from each other. The removed taper implant can be reused.

Figure 29:
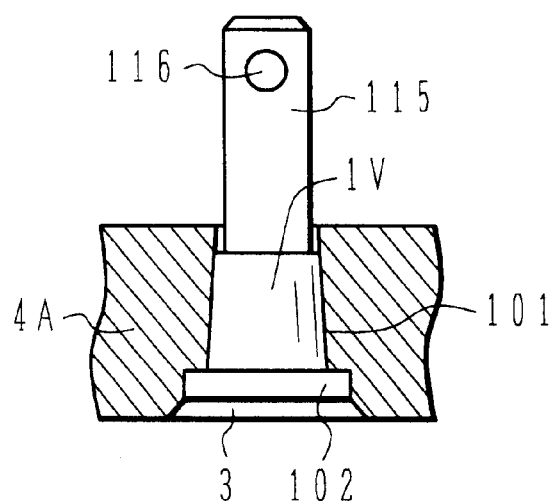
FIG. 29 is a partial vertical sectional view showing a taper implant with a tension spring post, in its driven state, according to a sixteenth embodiment of the present invention.

A taper implant with a tension spring post according to a sixteenth embodiment of the present invention will now be described with reference to FIG. 29. Note that the same reference numerals as in FIG. 17 denote the same portions.

A taper implant 1V with a tension spring post according to this embodiment comprises a taper portion 101 and a flange portion 102 as with the taper implant described in connection with FIG. 23. Further, in this embodiment, a tension spring post 115 having a hole 116 formed therein is provided at an end face of the taper portion 101 of the taper implant 1V on the smaller-diameter side.

A hole 3 as described above in connection with FIG. 4 is bored in a base member 4A by using a forming drill. In a like manner as described above in connection with FIG. 5, the taper implant 1V with a tension spring post is inserted into the hole 3 bored in the base member 4A by using a forming drill and then driven into the hole 3 by using a driving hammer or the like. The hole 3 is drilled from the rear side of the base member 4A. Therefore, the taper implant 1V is driven into the hole 3 from the rear side of the base member 4A such that the tension spring post 115 is projected outward from the front side of the base member 4A.

The taper implant 1V with a tension spring post is fixedly held on the base member 4A by frictional forces between the hole 3 and the taper implant 1V driven into the hole 3. By attaching one end of the tension spring to the hole 116, the tension spring can be fixed to the post 115 at one end thereof. Since the force imposed on the taper implant 1V from the tension spring acts in a direction to further tighten a fit between the taper implant 1V and the base member 4A, the taper implant 1V is more surely prevented from loosening.

As described above, by using the taper implant of this embodiment, the working efficiency can be improved.

Also, the joining strength between the taper implant and the base member can be increased and hence they are less easily separable from each other.

Further, the taper implant can be easily attached and detached, enabling it to be easily replaced. Therefore, the fastened member and the taper implant which are made of different materials can be discarded separately from each other. The removed taper implant can be reused.

Figure 30:
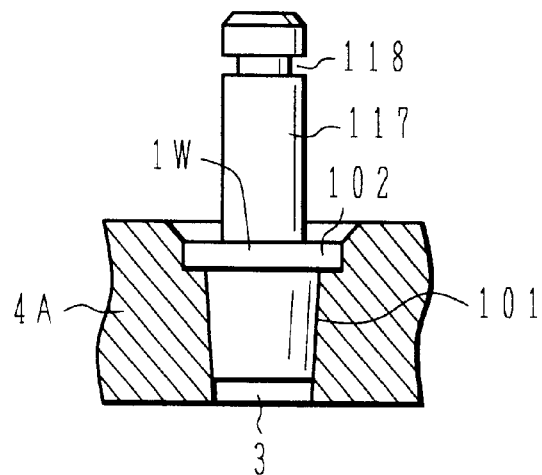
FIG. 30 is a partial vertical sectional view showing a taper implant with a tension spring post, in its driven state, according to a seventeenth embodiment of the present invention.

A taper implant with a tension spring post according to a seventeenth embodiment of the present invention will now be described with reference to FIG. 30. Note that the same reference numerals as in FIG. 17 denote the same portions.

A taper implant 1W with a tension spring post according to this embodiment comprises a taper portion 101 and a flange portion 102 as with the taper implant described in connection with FIG. 28. Further, in this embodiment, a tension spring post 117 is provided at an end face of the taper implant 1W on the side of the flange portion 102. The tension spring post 117 has an axis aligned with the axis of the taper portion 101. In other words, the tension spring post 117 serves as a coaxial fit portion extending in the axial direction of the taper portion 101. A hole 118 for attachment of one end of a tension spring is formed in the tension spring post 115 near its distal end.

A hole 3 as described above in connection with FIG. 4 is bored in a base member 4A by using a forming drill. In a like manner as described above in connection with FIG. 5, the taper implant 1U with a tension spring post is inserted into the hole 3 bored in the base member 4A by using a forming drill and then driven into the hole 3 by using a driving hammer or the like. The driving hammer used here has a piston so configured as to make driving force act on the flange portion 102 of the taper implant 1U with a tension spring post. Accordingly, the driving force will not act on the tension spring post 117 and hence the tension spring post 117 is prevented from deforming.

The taper implant 1W with a tension spring post is fixedly held on the base member 4A by frictional forces between the hole 3 and the taper implant 1W driven into the hole 3. The height of the tension spring post 117 is specified by the presence of the flange portion 102 of the taper implant 1W with a tension spring post.

By attaching one end of the tension spring to the groove 118, the tension spring can be fixed to the post 117 at one end thereof.

As described above, by using the taper implant of this embodiment, the working efficiency can be improved.

Further, the taper implant can be easily attached and detached, enabling it to be easily replaced. Therefore, the fastened member and the taper implant which are made of different materials can be discarded separately from each other. The removed taper implant can be reused.

Figure 31:
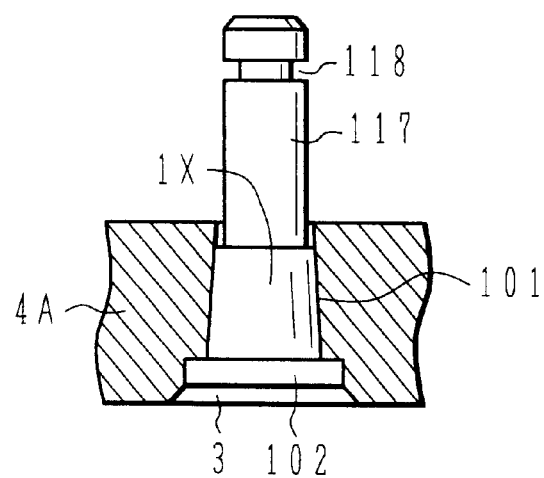
FIG. 31 is a partial vertical sectional view showing a taper implant with a tension spring post, in its driven state, according to an eighteenth embodiment of the present invention.

A taper implant with a tension spring post according to an eighteenth embodiment of the present invention will now be described with reference to FIG. 31. Note that the same reference numerals as in FIG. 17 denote the same portions.

A taper implant 1X with a tension spring post according to this embodiment comprises a taper portion 101 and a flange portion 102 as with the taper implant described in connection with FIG. 23. Further, in this embodiment, a tension spring post 117 having a groove 118 formed therein is provided at an end face of the taper portion 101 of the taper implant 1X on the smaller-diameter side.

A hole 3 as described above in connection with FIG. 4 is bored in a base member 4A by using a forming drill. In a like manner as described above in connection with FIG. 5, the taper implant 1X with a tension spring post is inserted into the hole 3 bored in the base member 4A by using a forming drill and then driven into the hole 3 by using a driving hammer or the like. The hole 3 is drilled from the rear side of the base member 4A. Therefore, the taper implant 1X is driven into the hole 3 from the rear side of the base member 4A such that the tension spring post 117 is projected outward from the front side of the base member 4A.

The taper implant 1X with a tension spring post is fixedly held on the base member 4A by frictional forces between the hole 3 and the taper implant 1X driven into the hole 3. By attaching one end of the tension spring to the groove 118, the tension spring can be fixed to the post 117 at one end thereof. Since the force imposed on the taper implant 1X from the tension spring acts in a direction to further tighten a fit between the taper implant 1X and the base member 4A, the taper implant 1X is more surely prevented from loosening.

As described above, by using the taper implant of this embodiment, the working efficiency can be improved.

Also, the joining strength between the taper implant and the base member can be increased and hence they are less easily separable from each other.

Further, the taper implant can be easily attached and detached, enabling it to be easily replaced. Therefore, the fastened member and the taper implant which are made of different materials can be discarded separately from each other. The removed taper implant can be reused.

Figure 32:
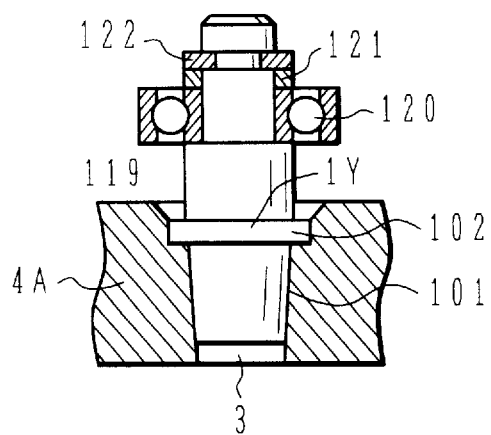
FIG. 32 is a partial vertical sectional view showing a taper implant with a bearing post, in its driven state, according to a nineteenth embodiment of the present invention.

A taper implant with a bearing post according to a nineteenth embodiment of the present invention will now be described with reference to FIG. 32. Note that the same reference numerals as in FIG. 17 denote the same portions.

A taper implant 1Y with a bearing post according to this embodiment comprises a taper portion 101 and a flange portion 102 as with the taper implant described in connection with FIG. 28. Further, in this embodiment, a bearing post 119 is provided at an end face of the taper implant 1Y on the side of the flange portion 102. The bearing post 119 has an axis aligned with the axis of the taper portion 101. In other words, the bearing post 119 serves as a coaxial fit portion extending in the axial direction of the taper portion 101.

A hole 3 as described above in connection with FIG. 4 is bored in a base member 4A by using a forming drill. In a like manner as described above in connection with FIG. 5, the taper implant 1Y with a bearing post is inserted into the hole 3 bored in the base member 4A by using a forming drill and then driven into the hole 3 by using a driving hammer or the like. The driving hammer used here has a piston so configured as to make driving force act on the flange portion 102 of the taper implant 1Y with a bearing post. Accordingly, the driving force will not act on the bearing post 119 and hence the bearing post 119 prevented from deforming.

The taper implant 1Y with a bearing post is fixedly held on the base member 4A by frictional forces between the hole 3 and the taper implant 1Y driven into the hole 3. The height of the bearing post 119 is specified by the presence of the flange portion 102 of the taper implant 1Y with a bearing post.

After driving the taper implant 1Y into the base member 4A, a ball bearing 120 is fitted over the post 119 from its top. Then, by placing a collar 121 on the ball bearing 120 and inserting a snap ring 122 into a groove defined between the collar 121 and the post 119, the ball bearing 120 is fixed to the post 119. Incidentally, the bearing 120 is not limited to a ball bearing, but may be a roll bearing.

As described above, by using the taper implant of this embodiment, the working efficiency can be improved.

Further, the taper implant can be easily attached and detached, enabling it to be easily replaced. Therefore, the taper implant of this embodiment is suitably employed under situations where the bearing tends to be much damaged. In addition, the fastened member and the taper implant which are made of different materials can be discarded separately from each other. The removed taper implant can be reused.

Figure 33:
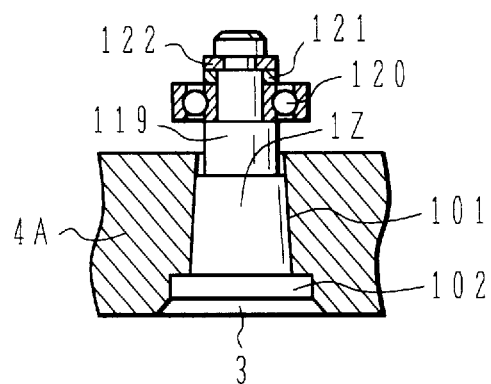
FIG. 33 is a partial vertical sectional view showing a taper implant with a bearing post, in its driven state, according to a twentieth embodiment of the present invention.

A taper implant with a bearing post according to a twentieth embodiment of the present invention will now be described with reference to FIG. 33. Note that the same reference numerals as in FIG. 17 denote the same portions.

A taper implant 1Z with a bearing post according to this embodiment comprises a taper portion 101 and a flange portion 102 as with the taper implant described in connection with FIG. 32. Further, in this embodiment, a bearing post 119 is provided at an end face of the taper portion 101 of the taper implant 1Z on the smaller-diameter side.

A hole 3 as described above in connection with FIG. 4 is bored in a base member 4A by using a forming drill. In a like manner as described above in connection with FIG. 5, the taper implant 1Z with a bearing post is inserted into the hole 3 bored in the base member 4A by using a forming drill and then driven into the hole 3 by using a driving hammer or the like. The hole 3 is drilled from the rear side of the base member 4A. Therefore, the taper implant 1Z is driven into the hole 3 from the rear side of the base member 4A such that the bearing post 119 is projected outward from the front side of the base member 4A.

After driving the taper implant 1Z into the base member 4A, a ball bearing 120 is fitted over the post 119 from its top.

Then, by placing a collar 121 on the ball bearing 120 and inserting a snap ring 122. into a groove defined between the collar 121 and the post 119, the ball bearing 120 is fixed to the post 119. Incidentally, the bearing 120 is not limited to a ball bearing, but may be a roll bearing.

The taper implant 1Z with a bearing post is fixedly held on the base member 4A by frictional forces between the hole 3 and the taper implant 1Z driven into the hole 3. Since the force imposed on the taper implant 1Z from the bearing acts in a direction to further tighten a fit between the taper implant 1Z and the base member 4A, the taper implant 1Z is more surely prevented from loosening.

As described above, by using the taper implant of this embodiment, the working efficiency can be improved.

Also, the joining strength between the taper implant and the base member can be increased and hence they are less easily separable from each other.

Further, the taper implant can be easily attached and detached, enabling it to be easily replaced. Therefore, the fastened member and the taper implant which are made of different materials can be discarded separately from each other. The removed taper implant can be reused.

Figure 34:
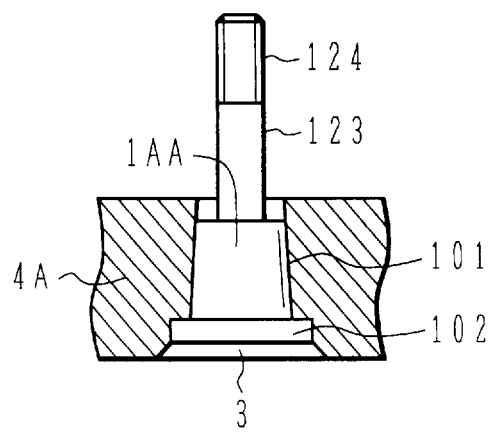
FIG. 34 is a partial vertical sectional view showing a taper implant with a stud bolt, in its driven state, according to a twenty-first embodiment of the present invention.

A taper implant with a stud bolt according to a twentyfirst embodiment of the present invention will now be described with reference to FIG. 34. Note that the same reference numerals as in FIG. 17 denote the same portions.

A taper implant 1AA with a stud bolt according to this embodiment comprises a taper portion 101 and a flange portion 102 as with the taper implant described in connection with FIG. 29. Further, in this embodiment, a stud bolt 123 is provided at an end face of the taper portion 101 of the taper implant 1AA on the smaller-diameter side. The stud bolt 123 has male threads 124 tapped near its tip.

A hole 3 as described above in connection with FIG. 4 is bored in a base member 4A by using a forming drill. In a like manner as described above in connection with FIG. 5, the taper implant 1AA with a stud bolt is inserted into the hole 3 bored in the base member 4A by using a forming drill and then driven into the hole 3 by using a driving hammer or the like. The hole 3 is drilled from the rear side of the base member 4A. Therefore, the taper implant 1AA is driven into the hole 3 from the rear side of the base member 4A such that the stud bolt 123 is projected outward from the front side of the base member 4A.

The taper implant 1AA with a stud bolt is fixedly held on the base member 4A by frictional forces between the hole 3 and the taper implant 1AA driven into the hole 3. Since the force imposed on the taper implant 1AA from a member fixed to the stud bolt 123 through the male threads 124 acts in a direction to further tighten a fit between the taper implant 1AA and the base member 4A, the taper implant 1AA is more surely prevented from loosening.

Figure 28:
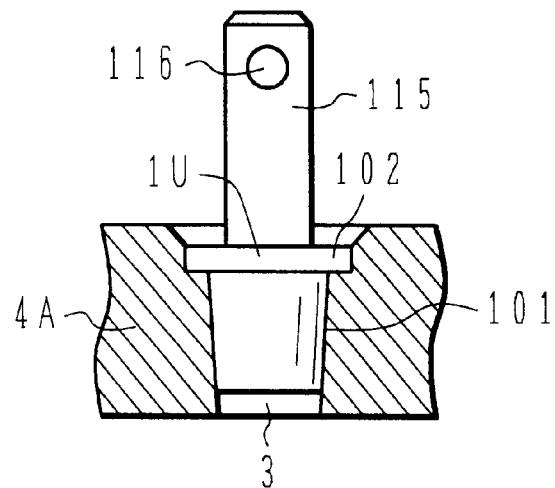
FIG. 28 is a partial vertical sectional view showing a taper implant with a tension spring post, in its driven state, according to a fifteenth embodiment of the present invention.

While the tamper implant 1AA is driven into the hole 3 from the rear side of the base member 4A in the illustrated embodiment, it may be modified to be driven from the front side of the base member 4A like the taper implant of FIG. 27 corresponding to the taper implant of FIG. 28.

As described above, by using the taper implant of this embodiment, the working efficiency can be improved.

Also, the joining strength between the taper implant and the base member can be increased and hence they are less easily separable from each other.

Further, the taper implant can be easily attached and detached, enabling it to be easily replaced. Therefore, the fastened member and the taper implant which are made of different materials can be discarded separately from each other. The removed taper implant can be reused.

According to the present invention, a taper implant including an axially extending member can be attached to a base member with higher working efficiency.

By using a taper implant with female threads, the screw-fastening structure can be simplified.

By using a forming drill, control of the tight-fit allowance of the taper implant can be easily achieved.

In addition, by using a hammer for driving the taper implant, damage of the base member can be prevented.

What is claimed is:

1. A method of fastening a first member and a second member using a taper implant comprising the steps of:
   providing said taper implant which includes:
      an outer surface, at least a portion of which is a taper portion being frusto-conical in shape whereby said taper implant has a larger diameter end and a smaller diameter end,
      a projecting portion connected to said larger diameter end and projecting outwardly with respect to said taper portion; and
      an axially extending hole in said taper portion, said hole having a female thread formed on an inside wall thereof;
   providing said first member which includes:
      a first wall portion having a hole therein, at least a portion of said hole being tapered to form a frusto-conical shape whereby said taper portion of said hole has a larger diameter end and a smaller diameter end; and
      wherein a taper rate of said taper portion of said hole is the same as a taper rate of said taper portion of said taper implant;
   inserting said taper implant into said hole of said first member;
   fixing said taper implant in said hole of said first member by applying a force to said projecting portion of said implant to drive said taper implant into said hole whereby an outer surface of said taper portion of said taper implant frictionally engages a surface of said taper portion of said hole;
   providing said second member which includes:
   a wall portion having a hole extending therethrough;
   positioning said second member in contact with said first member so that said hole of said second member is in alignment with said hole in said taper portion of said implant; and
   fastening said first member and said second member by inserting a screw having male threads through said hole in said second member and engaging the male threads of said screw with the female threads of said hole in said taper portion of said implant; and
   wherein said second member is arranged at said larger diameter end of said hole taper portion of said first member, and
   said screw having male threads is inserted into said hole of said taper implant from said larger diameter end of said taper portion.

2. A fastening method according to claim 1, wherein said taper implant is formed so that said larger diameter end of said taper portion of said taper implant has a diameter which is larger than a diameter of said larger diameter end of said taper portion of said hole of said first member.

3. A fastening method according to claim 1, wherein said taper implant is fabricated of materials harder than said first member.

4. A fastening method according to claim 1, wherein said taper implant is formed so that said projecting portion has a flat surface lying perpendicularly to the axial direction of said taper portion of said taper implant.

5. A fastening method according to claim 1, wherein said first member is formed so that said hole of the wall portion of said first member has a counterbored portion at the larger diameter end thereof, said counterbored portion being cylindrical in shape and having a larger diameter than said larger diameter end of said hole and said projecting portion of said taper implant is received in said counterbored portion.

6. A fastening method according to claim 5, wherein a depth of said hole step portion of said first member is deeper than a thickness of said projecting portion of said taper implant.

7. A fastening method according to claim 1, wherein said first member and said taper implant are formed so that said taper rate of said taper portion of said hole and said taper rate of said taper portion of said taper implant are both 1/50–1/6.

8. A fastening method according to claim 1, wherein said taper implant is formed to include a counterbored portion either at the large diameter end of the taper portion or at the smaller diameter end of the taper portion.

9. A fastening method according to claim 1, wherein said taper implant is formed to include a groove in the outer surface of the taper portion of said taper implant at the larger diameter end thereof.

10. A fastening method according to claim 1, wherein said projecting portion of said taper implant is a flange.

11. A fastening method according to claim 1, wherein an axis of said hole of said taper implant and an axis of said taper portion of said taper implant are aligned.

12. A fastening method according to claim 1, wherein a diameter d1 of said larger diameter end of said taper portion of said taper implant is 1.1–2 times a diameter d0 of a male screw to be put into said female thread of said axially extending hole, a diameter d2 of said projecting portion is d0+(0.5 mm–3 mm), a thickness t of said projecting portion is 0.5 mm–3 mm, and a length L of said taper implant is d0×(1–3).

13. A fastening method according to claim 1, wherein said taper implant is fabricated of a material selected from the group consisting of stainless steel, aluminum, SS steel, carbon steel, light alloy steel, tempered steel hardened and annealed at a HRC 15 to 25 degrees, phosphor bronze, brass and plastic material.

14. A fastening method according to claim 1, further comprising the steps of:
   making a forming drill, said forming drill integrally including:
      a taper portion drilling bit for boring a hole into which a taper portion of said taper implant is to be inserted, and
      a step portion drilling bit for boring a hole into which a projecting portion of said taper implant is to be inserted; and
   forming said hole in said first member by said forming drill.

15. A fastening method according to claim 14, wherein said forming drill further comprises a hole end deburring bit for removing burrs at an uppermost edge of said hole.

16. A method for fixing a taper implant to a receiving member, comprising the steps of:
   providing said taper implant which includes:
      an outer surface, at least a portion of which is a taper portion being frusto-conical in shape whereby said taper implant has a larger diameter end and a smaller diameter end,
      a projecting portion connected to said larger diameter end and projecting outwardly with respect to said taper portion; and
      an axially extending hole in said taper portion, extending downwardly from said larger diameter end of said taper implant;
      said hole having a female thread formed on an inside wall thereof whereby said hole receives a screw having male threads inserted from said larger diameter end of said implant;
   providing said receiving member which includes:
      a first wall portion having a hole therein, at least a portion of said hole being tapered to form a frusto-conical shape whereby said taper portion of said hole has a larger diameter end and a smaller diameter end; and
      wherein a taper rate of said taper portion of said hole is the same as the taper rate of said taper portion of said taper implant;
   inserting said taper implant into said hole of said first member; and
   fixing said taper implant in said hole of said first member by applying a force to said projecting portion of said taper implant to drive said taper implant into said hole whereby an outer surface of said taper portion of said taper implant frictionally engages a surface of said taper portion of said hole.

17. A fixing method according to claim 16, wherein said taper implant is formed so that said larger diameter end of said taper portion of said taper implant has a diameter which is larger than a diameter of said larger diameter end of said taper portion of said hole of said receiving member.

18. A fixing method according to claim 16, wherein said taper implant is fabricated of materials harder than said receiving member.

19. A fixing method according to claim 16, wherein said taper implant is formed so that said projecting portion has a flat surface lying perpendicularly to the axial direction of said taper portion of said taper implant.

20. A fixing method according to claim 16, in said step wherein said receiving member is formed so that said hole of the wall portion of said receiving member has a counterbored portion at the larger diameter end thereof, said counterbored portion being cylindrical in shape and having a larger diameter than said larger diameter end of said hole and said projecting portion of said taper implant is received in said counterbored portion.

21. A fixing method according to claim 16, wherein said receiving member and said taper implant are formed so that said taper rate of said taper portion of said hole and said taper rate of said taper portion of said taper implant are both 1/50–1/6.

22. A fixing method according to claim 16, wherein said taper implant is formed to include a counterbored portion either at the large diameter end of the taper portion or at the smaller diameter end of the taper portion.

23. A fixing method according to claim 16, wherein said taper implant is formed to include a groove in the outer surface of the taper portion of said taper implant at the larger diameter end thereof.

24. A fixing method according to claim 16, wherein said projecting portion of said taper implant is a flange.

25. A fixing method according to claim 16, wherein an axis of said hole of said taper implant and an axis of said taper portion of said taper implant are aligned.

26. A fixing method according to claim 16, wherein said hole of said taper implant includes a female thread formed on an inside wall of said hole.

27. A fixing method according to claim 16, wherein a diameter d1 of said larger diameter end of said taper portion of said taper implant is 1.1–2 times a diameter d0 of a male screw to be put into said female thread of said axially extending hole, a diameter d2 of said projecting portion is d0+(9.5 mm–3 mm), a thickness t of said projecting portion is 0.5 mm–3 mm), a thickness t of said projecting portion is 0.5 mm–3 mm, and a length L of said taper implant is d0×(1–3).

28. A fixing method according to claim 16, wherein said taper implant is fabricated of a material selected from the group consisting of stainless steel, aluminum, SS steel, carbon steel, light alloy steel, tempered hardened and annealed at a HRC 15 to 25 degrees, phosphor bronze, brass and plastic material.

29. A fixing method according to claim 16, wherein an axis of said hole of said taper implant and an axis of said taper portion of said taper implant are aligned.

30. A fixing method according to claim 16, further comprising the steps of:
  making a forming drill, said forming drill integrally including:
    a taper portion drilling bit for boring a hole into which a taper portion of said taper implant is to be inserted, and
    a step portion drilling bit for boring a hole into which a projecting portion of said taper implant is to be inserted; and
  forming said hole in said receiving member by said forming drill.

31. A fixing method according to claim 30, wherein said forming drill further comprises a hole end deburring bit for removing burrs at an uppermost edge of said hole.

* * * * *